United States Patent
Tang et al.

(10) Patent No.: US 9,729,175 B2
(45) Date of Patent: Aug. 8, 2017

(54) TECHNIQUES TO MANAGE RADIO FREQUENCY CHAINS

(71) Applicant: Intel IP Corporation, Santa Clara, CA (US)

(72) Inventors: Yang Tang, Pleasanton, CA (US); Rui Huang, Beijing (CN); Candy Yiu, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 9 days.

(21) Appl. No.: 14/581,889

(22) Filed: Dec. 23, 2014

(65) Prior Publication Data

US 2015/0327103 A1 Nov. 12, 2015

Related U.S. Application Data

(60) Provisional application No. 61/990,646, filed on May 8, 2014.

(51) Int. Cl.
*H04W 24/10* (2009.01)
*H04B 1/00* (2006.01)
*H04W 72/04* (2009.01)

(52) U.S. Cl.
CPC .......... *H04B 1/0053* (2013.01); *H04W 24/10* (2013.01); *H04W 72/0453* (2013.01)

(58) Field of Classification Search
CPC .................................................... H04B 1/0053
See application file for complete search history.

(56) References Cited

U.S. PATENT DOCUMENTS

| | | | | |
|---|---|---|---|---|
| 8,537,802 B2* | 9/2013 | Erell | ..................... | H04L 1/0026 370/252 |
| 8,594,050 B2* | 11/2013 | Kesselman | ........... | H04W 88/06 370/327 |
| 9,077,676 B2* | 7/2015 | Price | ....................... | H04L 51/30 |
| 9,113,450 B2* | 8/2015 | Pelletier | ................ | H04W 74/04 |
| 9,253,670 B2* | 2/2016 | Kim | ..................... | H04B 7/0413 |
| 9,325,462 B2* | 4/2016 | Nakamori | ............... | H04L 5/001 |

(Continued)

OTHER PUBLICATIONS

International Search Report and Written Opinion received for PCT Patent Application No. PCT/US2015/024806, mailed Jul. 16, 2015, 12 pages.

(Continued)

*Primary Examiner* — Parth Patel

(57) ABSTRACT

Various embodiments may be generally directed to techniques for configuring a secondary RF chain of a mobile device—in particular, a secondary receiver chain—to perform wireless network measurements when the secondary RF chain is not used for data communications. Various embodiments provide for a primary RF chain to provide data communications with a wireless network and for the secondary RF chain to be capable of providing aggregated data communications with the wireless network. Various embodiments provide for the mobile device to determine that the wireless network does not support carrier aggregation and to reconfigure the secondary receiver chain, which would otherwise be left unused or inactive, to perform wireless network measurements. System throughout can be improved in comparison to using the primary RF chain for performing the wireless network measurements.

24 Claims, 12 Drawing Sheets

_700_

| Gap Pattern ID | Measurement Gap Length (MGL, ms) | Measurement Gap Repetition Period (MGRP, ms) | Minimum Available Time for Inter-Frequency and Inter-RAT Measurements during 480 ms Period (Tinter1, ms) | Measurement Purpose |
|---|---|---|---|---|
| _702_ 0 | 6 | 40 | 60 | Inter-Frequency E-UTRAN FDD and TDD, UTRAN FDD, GERAN, LCR TDD, HRPD, CDMA2000 1x |
| _704_ 1 | 6 | 80 | 30 | Inter-Frequency E-UTRAN FDD and TDD, UTRAN FDD, GERAN, LCR TDD, HRPD, CDMA2000 1x |
| _706_ 2 | 31 | 120 | 120 | Inter-Frequency E-UTRAN FDD and TDD, UTRAN FDD, GERAN, LCR TDD, HRPD, CDMA2000 1x |
| _708_ 3 | 16 | 120 | 60 | Inter-Frequency E-UTRAN FDD and TDD, UTRAN FDD, GERAN, LCR TDD, HRPD, CDMA2000 1x |

(56) References Cited

U.S. PATENT DOCUMENTS

| | | | | |
|---|---|---|---|---|
| 9,331,826 | B2 * | 5/2016 | Kim | H04L 5/003 |
| 9,515,771 | B2 * | 12/2016 | Venkob | H04L 5/001 |
| 2008/0189970 | A1 * | 8/2008 | Wang | H04W 36/0055 |
| | | | | 33/701 |
| 2010/0227639 | A1 * | 9/2010 | Kim | H04B 1/005 |
| | | | | 455/525 |
| 2011/0080962 | A1 * | 4/2011 | Blankenship | H04B 7/2606 |
| | | | | 375/259 |
| 2011/0170483 | A1 * | 7/2011 | Ishii | H04W 72/0446 |
| | | | | 370/328 |
| 2011/0199908 | A1 * | 8/2011 | Dalsgaard | H04W 24/10 |
| | | | | 370/241 |
| 2011/0237202 | A1 * | 9/2011 | Uemura | H04W 36/0088 |
| | | | | 455/67.14 |
| 2013/0003584 | A1 * | 1/2013 | Alriksson | H03G 3/3052 |
| | | | | 370/252 |
| 2013/0286933 | A1 * | 10/2013 | Lee | H04L 1/0026 |
| | | | | 370/315 |
| 2013/0286952 | A1 * | 10/2013 | Ghosh | H04L 5/0007 |
| | | | | 370/329 |
| 2013/0308481 | A1 * | 11/2013 | Kazmi | H04W 24/02 |
| | | | | 370/252 |
| 2013/0329586 | A1 * | 12/2013 | Mucke | H04W 24/02 |
| | | | | 370/252 |
| 2013/0329589 | A1 * | 12/2013 | Cave | H04W 36/0083 |
| | | | | 370/252 |
| 2014/0010189 | A1 * | 1/2014 | Tian | H04L 1/1822 |
| | | | | 370/329 |
| 2014/0036881 | A1 * | 2/2014 | Kim | H04L 5/001 |
| | | | | 370/336 |
| 2014/0044000 | A1 * | 2/2014 | Charbit | H04W 24/08 |
| | | | | 370/252 |
| 2014/0094162 | A1 * | 4/2014 | Heo | H04W 48/14 |
| | | | | 455/422.1 |
| 2014/0128115 | A1 * | 5/2014 | Siomina | H04L 1/0015 |
| | | | | 455/501 |
| 2014/0146697 | A1 * | 5/2014 | Kim | H04B 7/0413 |
| | | | | 370/252 |
| 2014/0204850 | A1 * | 7/2014 | Kim | H04L 5/0078 |
| | | | | 370/329 |
| 2014/0274095 | A1 * | 9/2014 | Saito | H04W 48/16 |
| | | | | 455/452.1 |
| 2014/0302865 | A1 * | 10/2014 | Bai | H04W 24/10 |
| | | | | 455/452.1 |
| 2014/0341192 | A1 * | 11/2014 | Venkob | H04L 5/001 |
| | | | | 370/336 |
| 2015/0245235 | A1 * | 8/2015 | Tang | H04W 36/0088 |
| | | | | 370/252 |
| 2016/0183173 | A1 * | 6/2016 | Harada | H04W 48/12 |
| | | | | 455/434 |
| 2017/0019810 | A1 * | 1/2017 | Wu | H04W 24/10 |

OTHER PUBLICATIONS

"Measurement Gap Issues for Dual Connectivity", CATT, 3GPP TSG RAN WG2 #85, R2-141558, Mar. 21, 2014, 5 pages (author unknown).

"Measurement Gap Configuration in Dual Connectivity", NTT DOCOMO, Inc., 3GPP TSG RAN WG2 #85, R2-141236, Mar. 22, 2014, 2 pages (author unknown).

"Discussion on Measurement Gap in Dual Connectivity", Samsung, 3GPP TSG RAN WG2 #85, R2-141400, Mar. 22, 2014, 3 pages (author unknown).

* cited by examiner

| Gap Pattern ID | Measurement Gap Length (MGL, ms) | Measurement Gap Repetition Period (MGRP, ms) | Minimum Available Time for Inter-Frequency and Inter-RAT Measurements during 480 ms Period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 31 | 120 | 120 | Inter-Frequency E-UTRAN FDD and TDD, UTRAN FDD, GERAN, LCR TDD, HRPD, CDMA2000 1x |
| 3 | 16 | 120 | 60 | Inter-Frequency E-UTRAN FDD and TDD, UTRAN FDD, GERAN, LCR TDD, HRPD, CDMA2000 1x |

702 → row 0
704 → row 1
706 → row 2
708 → row 3

Broadband Wireless Access System 1100

(12) United States Patent
US 9,729,175 B2

TECHNIQUES TO MANAGE RADIO FREQUENCY CHAINS

RELATED CASE

This application claims priority to U.S. Provisional Patent Application No. 61/990,646, filed May 8, 2014, the entirety of which is hereby incorporated by reference.

TECHNICAL FIELD

Embodiments herein generally relate to communications between devices in broadband communications networks and the performance of wireless network measurements.

BACKGROUND

In an evolved Universal Mobile Telecommunications System Terrestrial Radio Access Network (E-UTRAN), a user equipment (UE) may include multiple radio frequency (RF) chains. One or more RF chains may remain idle. Efficient management of the multiple RF chains can improve system throughput and experience of a user of the UE.

BRIEF DESCRIPTION OF THE DRAWINGS

FIG. 7 illustrates exemplary measurement configurations.

DETAILED DESCRIPTION

Figure 1:
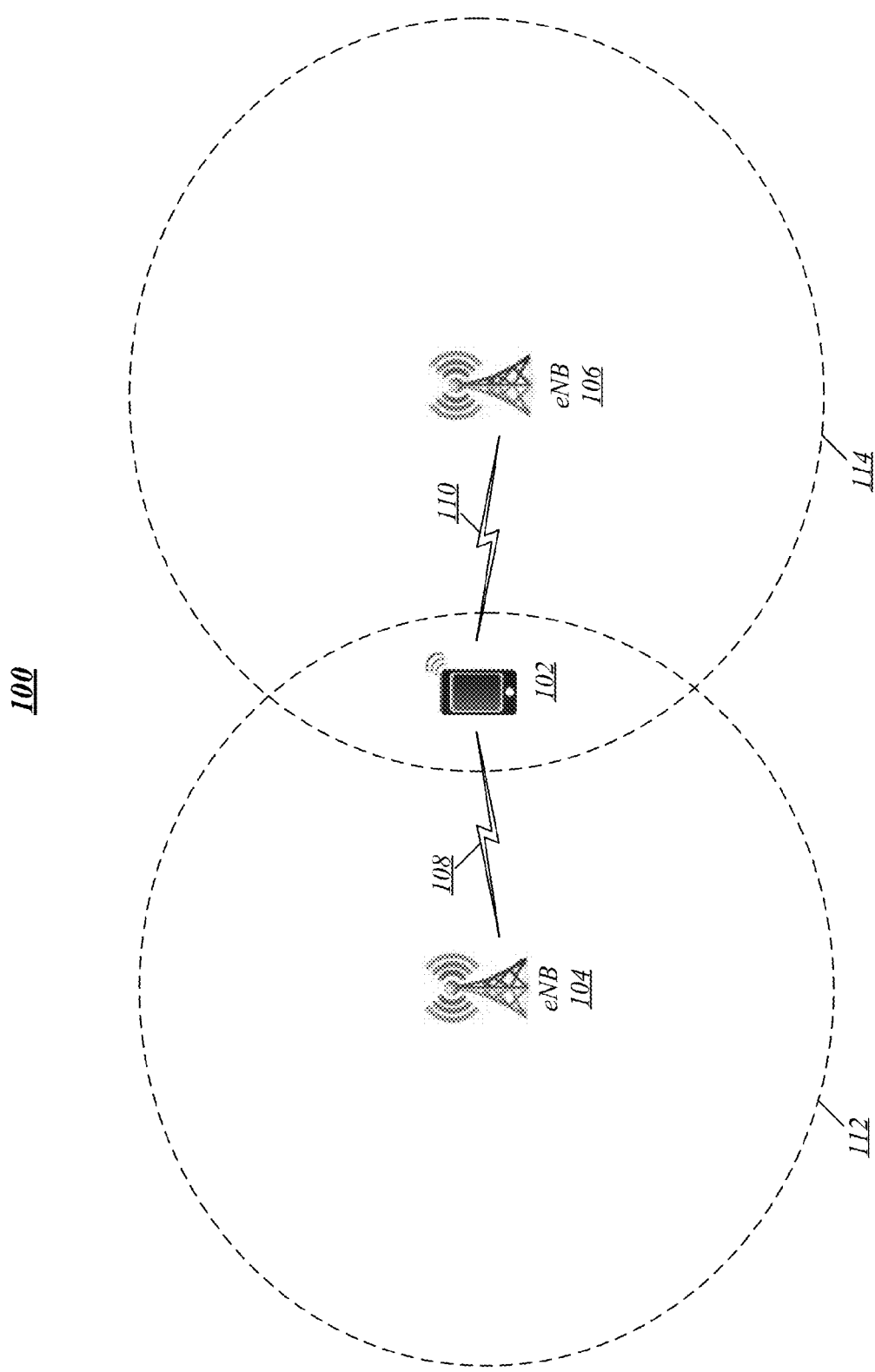
FIG. 1 illustrates an embodiment of a first operating environment.

In an evolved Universal Mobile Telecommunications System Terrestrial Radio Access Network (E-UTRAN), a user equipment (UE) may include one or more radio frequency (RF) chains to support carrier aggregation (CA). At times, however, the UE may operate within a wireless network that does not support CA leaving one or more secondary RF chains unused or inactive while a primary RF chain provides data communications with the wireless network. Using the primary RF chain to perform wireless network measurements while also supporting data communications can significantly reduce system throughput and degrade the experience of a user of the UE.

Various embodiments provide efficient management of multiple RF chains of a UE. Various embodiments may be generally directed to techniques for configuring a secondary RF chain of a mobile device—in particular, a secondary receiver chain—to perform wireless network measurements when the secondary RF chain is not used for data communications. Various embodiments provide for a primary RF chain to provide data communications with a wireless network and for the secondary RF chain to be capable of providing aggregated data communications with the wireless network. Various embodiments provide for the mobile device to determine that the wireless network does not support carrier aggregation and to reconfigure the secondary receiver chain, which would otherwise be left unused or inactive, to perform wireless network measurements. System throughput can be improved in comparison to using the primary RF chain for performing the wireless network measurements.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA), High Speed Packet Access (HSPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency Wireless Local Area Network (WLAN) (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 such as may be representative of some embodiments. The operating environment 100 can include a mobile device 102, a first cellular base station 104, and a second cellular base station 106. The mobile device 102 can communicate with the first base station 104 over a first wireless communications interface 108 and can communicate with the second base station 106 over a second wireless communication interface 110.

The mobile device 102 can be a smartphone, tablet, laptop, netbook, or other mobile computing device capable of communicating wirelessly with one or more wireless communication networks. As an example, the mobile device 102 can be a user equipment (UE). The first base station 104 can be, for example, an evolved node B (eNB). The second base station 106 can be, for example, an evolved node B (eNB). The first base station 104 can provide communications within a first cell 112. The second base station 106 can provide communications within a second cell 114.

The wireless communications interface 108 can be, for example, a 3GPP wireless network interface and/or an LTE network interface. The wireless communications interface 110 can be, for example, a 3GPP wireless network interface and/or an LTE network interface. In various embodiments, the mobile device 102 can communicate with the base station 104 and the base station 106 substantially simultaneously. As an example, as shown in FIG. 1, the mobile device 102 can be located or positioned within the first cell 112 and the second cell 114. The base stations 104 and 106 and the mobile device 102 can transmit and receive voice, data, and/or control data or information over the wireless communication interfaces 104 and 106. By communicating with each of the base stations 104 and 106, the mobile device 102 can communicate over a larger combined bandwidth as compared to a bandwidth available by communicating with only one of the base stations 104 or 106. As a result, the mobile device 102 can communicate at increased rates, thereby enhancing the performance of the mobile device 102 and the experience of a user of the mobile device 102.

In various embodiments, the mobile device 102 can communicate with the base station 104 over a first carrier frequency and/or first frequency range and can communicate with the base station 106 over a second carrier frequency and/or a second frequency range. To avoid and/or minimize interference, a frequency of the first carrier and a frequency of the second carrier can be different. The first frequency range can be different from the second frequency range. For example, the first and second frequency ranges can be non-overlapping frequency ranges.

In various embodiments, the mobile device 102 can be a carrier aggregation (CA) capable UE, capable of communicating with the eNB 104 operating as a primary serving cell (Pcell) using a first carrier frequency and communicating with the eNB 106 operating as a secondary serving cell (Scell) using a second carrier frequency. The CA capable UE 102 can combine or aggregate communications over the first and second carriers to expand a communications bandwidth. The first and second carriers can operate as component carriers. The Pcell eNB 104 can provide communications with the UE 102 over a primary component carrier and the Scell eNB 106 can provide communications with the UE 102 over a secondary component carrier. The UE 102 is not limited to aggregating component carriers from one Scell. Instead, the UE 102 can aggregate multiple carriers from multiple SCells (not depicted in FIG. 1) with the carrier from the Pcell. For purposes of illustration only, various embodiments are described in relation to the UE 102 communication with two base stations (i.e., the base stations 104 and 106) but such embodiments are not so limited.

The CA capable UE 102 and the eNBs 104 and 106 can operate according to any one of a number of CA modes that can be determined by the operating frequencies of the primary and secondary component carries. As a first example, in an intraband contiguous CA mode, the primary component carrier and the secondary component carrier can be adjacent carriers (e.g., adjacent available carrier frequencies) within the same operating frequency band. As a second example, in an intraband non-contiguous CA mode, the primary component carrier and the secondary component carrier can be non-adjacent carriers (e.g., non-adjacent available carrier frequencies) within the same operating frequency band. As a third example, in an interband mode, the primary component carrier and the secondary component carrier can be carriers within different operating frequency bands.

The CA capable UE 102 can be designed and operated to communicate with the eNBs 104 and 106 in the various CA modes. To do so, in various embodiments, the CA capable UE 102 can include one or more radio frequency (RF) chains or front ends. Each RF front end can be configured (e.g., tuned) to communicate with a particular eNB (e.g. based on the particular frequency of the carrier of the eNB). Each RF front end can include a transmitter and a receiver path.

As shown in FIG. 1, the CA capable UE 102 communicates with two eNBs 104 and 106 but is not so limited. As previously mentioned, the CA capable UE 102 can communicate with any number of eNBs to facilitate CA to realize additional bandwidth aggregation. Additional eNBs can communicate with the CA capable UE 102 using an additional secondary component carrier. As such, in various embodiments, the CA capable UE 102 may include an RF front end for each component carrier/eNB. The operating environment 100 depicted in FIG. 1 can be considered of be a CA configured operating environment. Specifically, the UE 102 and the eNBs 104 and 106 are capable of supporting CA by the UE 102.

Figure 2A:
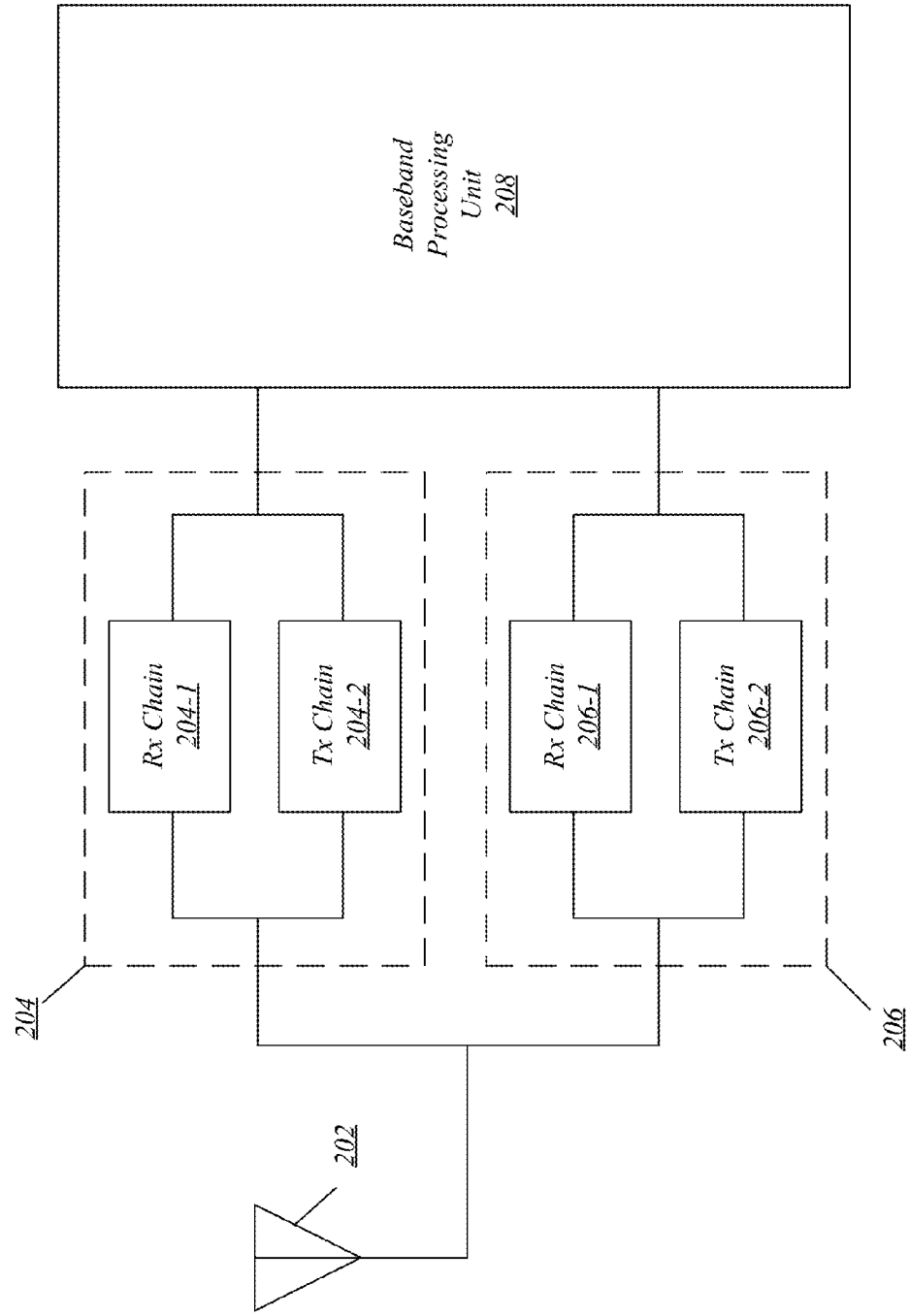
FIG. 2A illustrates an embodiment of a first apparatus.

FIG. 2A illustrates an RF front end 200 of a mobile device such as may be representative of some embodiments. The RF front end 200 can be implemented by the mobile device 102 depicted in FIG. 1. The RF front end 200 can include an antenna 202, a first RF chain 204, a second RF chain 206, and a baseband processing unit 208. The first RF chain 204 can include a receiver or a receiver chain 204-1 and a transmitter or a transmitter chain 204-2. The second RF chain 206 can include a receiver or a receiver chain 206-1 and a transmitter or a transmitter chain 206-2. In various embodiments, the RF chains 204 and 206 can be implemented on a single integrated circuit.

The first RF chain 204 can be configured and/or operated to provide communications over a first carrier frequency or first frequency range. As an example, the first RF chain 204 can be tuned to a first carrier and/or a first carrier frequency or frequency range. The second RF chain 204 can be configured and/or operated to provide communications over a second carrier frequency or frequency range. As an example, the second RF chain 206 can be tuned to a second carrier and/or a second carrier frequency or frequency range. In various embodiments, the Rx chain 204-1 and the Tx chain 204-2 can be configured or tuned to communicate with a primary component carrier from a Pcell eNB (e.g., a primary component carrier of the eNB 104 depicted in FIG. 1) and the Rx chain 206-1 and the Tx chain 206-2 can be configured or tuned to communicate with a secondary component carrier from an Scell eNB (e.g., a secondary component carrier of the eNB 106 depicted in FIG. 1).

The RF front end 200 can transmit and receive RF communications and/or signals through the antenna 202. The Rx chains 204-1 and 206-1 can receive and process the RF communications. As an example, the Rx chains 204-1 and 206-1 can, among other operations, convert the received RF communications and/or signals to baseband frequency communications and/or signals that can be provided to the baseband processing unit 208 for further processing or manipulation. In this way, the Rx chains 204-1 and 206-1 can provide down conversion from one or more different RF carrier frequencies corresponding to their individual configurations or tunings.

The Tx chains 204-2 and 206-2 can process and transmit RF communications. As an example, the Tx chains 204-2 and 206-2 can, among other operations, convert baseband communications and/or signals from the baseband processing unit 208 to RF frequencies. In this way, the Tx chains 204-2 and 206-2 can provide up conversion to one or more different RF carrier frequencies corresponding to their individual configurations or tunings.

Again, in various embodiments, the Rx chain 204-1 and the Tx chain 204-2 can be tuned to or operated in accordance with a first carrier frequency and the Rx chain 204-1 and the Tx chain 204-2 can be tuned to or operated in accordance with a second carrier frequency, with the first and second carrier frequencies being different or distinct and providing communications over different or distinct frequency ranges. In various embodiments, the RF chain 204 can be considered to be a primary RF chain (including primary Rx chain 204-1 and primary Tx chain 204-2) as it is configured and/or operated to communicate with a Pcell. Data communications with the wireless network can be provided by operating the primary RF chain 204. The RF chain can be considered to be a secondary RF chain (including secondary Rx chain 206-1 and secondary Tx chain 206-2) as it is configured and/or operated to communicate with an Scell. Although not depicted in FIG. 2A for purposes of clarity, any additional RF chains other than the primary RF chain 204 would be considered to be an additional secondary RF chain.

The first and second RF chains 204 and 206, and any constituent component included therein, and the baseband processing unit 208 can be implemented in hardware or software or any combination thereof. As an example, one or more of the first and second RF chains 204 and 206, and any constituent component included therein, and the baseband processing unit 208 may comprise logic, circuitry, or instructions to facilitate communications between one or more RF frequencies and one or more baseband frequencies. Further, constituent components of the first and second RF chains 204 and 206 may be shared across the first and second RF chains 204 and 206. As an illustrative example, one or more components, which can be logic, hardware, software, and/or instructions, and any combination thereof, of the Rx chain 204-1 can be shared with the Tx chain 204-2 or the Rx chain 206-1 or the Tx chain 206-2.

Figure 2B:
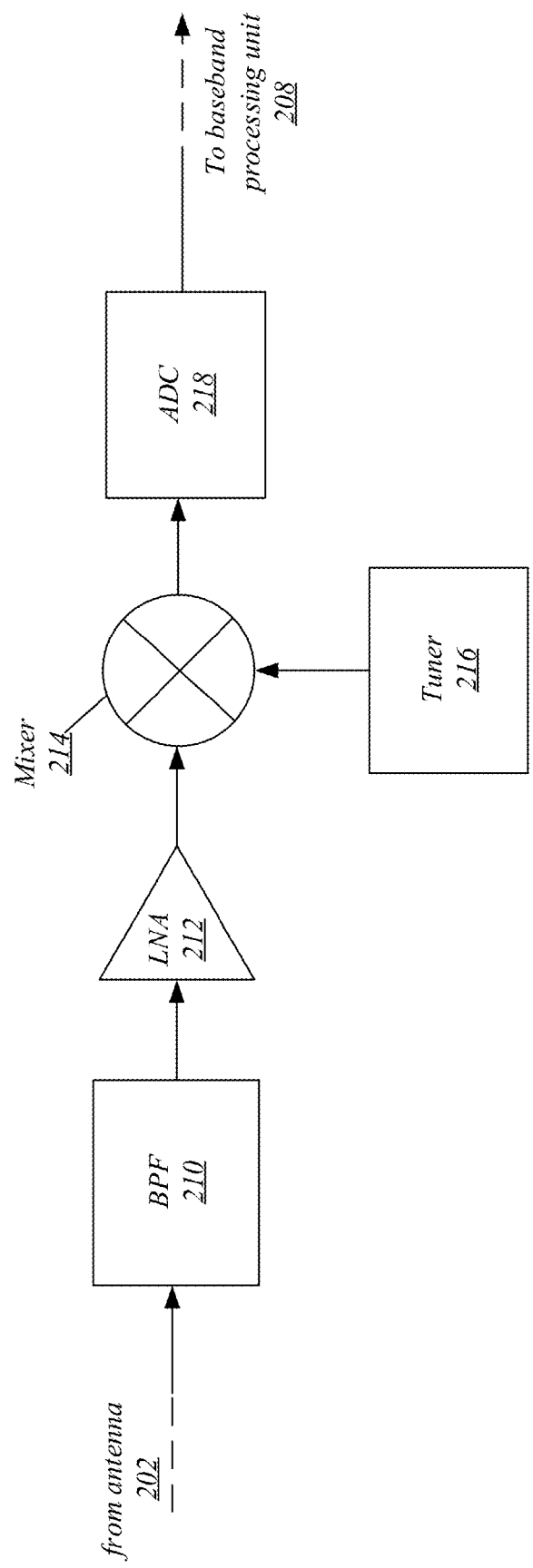
FIG. 2B illustrates an embodiment of a second apparatus.

FIG. 2B illustrates exemplary components of receiver and/or receiver chain 206-1 such as may be representative of some embodiments. FIG. 2B is exemplary in that Rx chain 206-1 may include more or fewer components as depicted in FIG. 2B. As shown in FIG. 2B, the Rx chain 206-1 can include a bandpass filter (BPF) 210, a low noise amplifier (LNA) 212, a mixer 214, a tuner 216, and an ADC 218. The Rx chain 206-1 can include additional components such as, for example a detector and/or a demodulator.

The BPF 210 can be coupled to an antenna such as, for example, the antenna 202 depicted in FIG. 2A. The BPF 210 can receive RF communications or signals from the antenna 202. The BPF 210 can provide band pass filtered RF signals to the LNA 212. The LNA 212 can amplify the signals received from the BPF 210. The LNA 212 can provide the amplified RF signals to the mixer 214. The mixer 214 can down convert the RF signals received from the LNA 212. The mixer 214 can down convert signals based on a reference signal or tuning signal provided by the tuner 216. The tuner 216 can be controlled to adjust a frequency of the reference signal provided to the mixer 214. As an example, the tuner 216 can be controlled to provide a reference signal having a frequency substantially the same as the frequency of the component carrier signal provided by the eNB 106 depicted in FIG. 1.

The mixer 214 can convert RF signals received from the LNA 212 to baseband frequencies. The baseband signals from the mixer 218 can be provided to the analog-to-digital converter (ADC) 218. The ADC 218 can convert analog baseband signals provided by the mixer 214 to digital signals. The digital signals from the ADC 218 can be provided to a baseband processor such as, for example, the baseband processing unit 208 depicted in FIG. 2A. In some embodiments, the ADC 218 and/or its functionality can be provided by the baseband processing unit 208.

The constituent components of the Rx chain 206-1 depicted in FIG. 2B can be implemented in hardware or software or any combination thereof. As an example, one or more of the constituent components of the Rx chain 206-1 depicted in FIG. 2B may comprise logic, circuitry, or instructions to facilitate reception of RF communications for a mobile device (e.g., the mobile device 102 depicted in FIG. 1) and conversion of received RF communications to baseband for further processing. The Rx chain 206-1 depicted in FIG. 2B can be considered to be a secondary Rx chain as it can be configured and/or operated to communicate with an Scell and can be tuned to a frequency of the secondary component carrier of the Scell.

The Rx chain 206-1 depicted in FIG. 2B can be implemented to receive RF communications over a particular carrier frequency and/or frequency range based on a frequency tuning of the tuner 216. RF communications can be received over different carrier frequencies and/or frequency ranges by adjusting the tuning of the tuner 216 (e.g., by adjusting a frequency of a reference RF frequency signal provided by the tuner 216). In this way, the Rx chain 206-1 can be considered to be tuned to a particular RF carrier frequency or RF frequency range. As an example, the Rx chain 206-1 can be tuned to an RF carrier frequency or RF frequency range of particular base station such as, the eNB 106 depicted in FIG. 1. As a result, the Rx chain can provide for the reception of RF signals or communications from the eNB 106.

The Rx chain 204-1 can be similarly configured to include similar constituent components with a tuner tuned to a different RF carrier frequency or RF frequency range (e.g., to the RF carrier frequency or RF frequency range of the eNB 104 depicted in FIG. 1). As a result, Rx chains 204-1 and 206-1 can provide for the reception of RF signals or communications from two different base stations simultaneous, thereby providing CA. For example, the Rx chain 204-1 can receive RF communications from a primary carrier component associated with the eNB 104 and the Rx chain 206-1 can receive RF communications from a secondary carrier component associated with the eNB 106.

Figure 3:
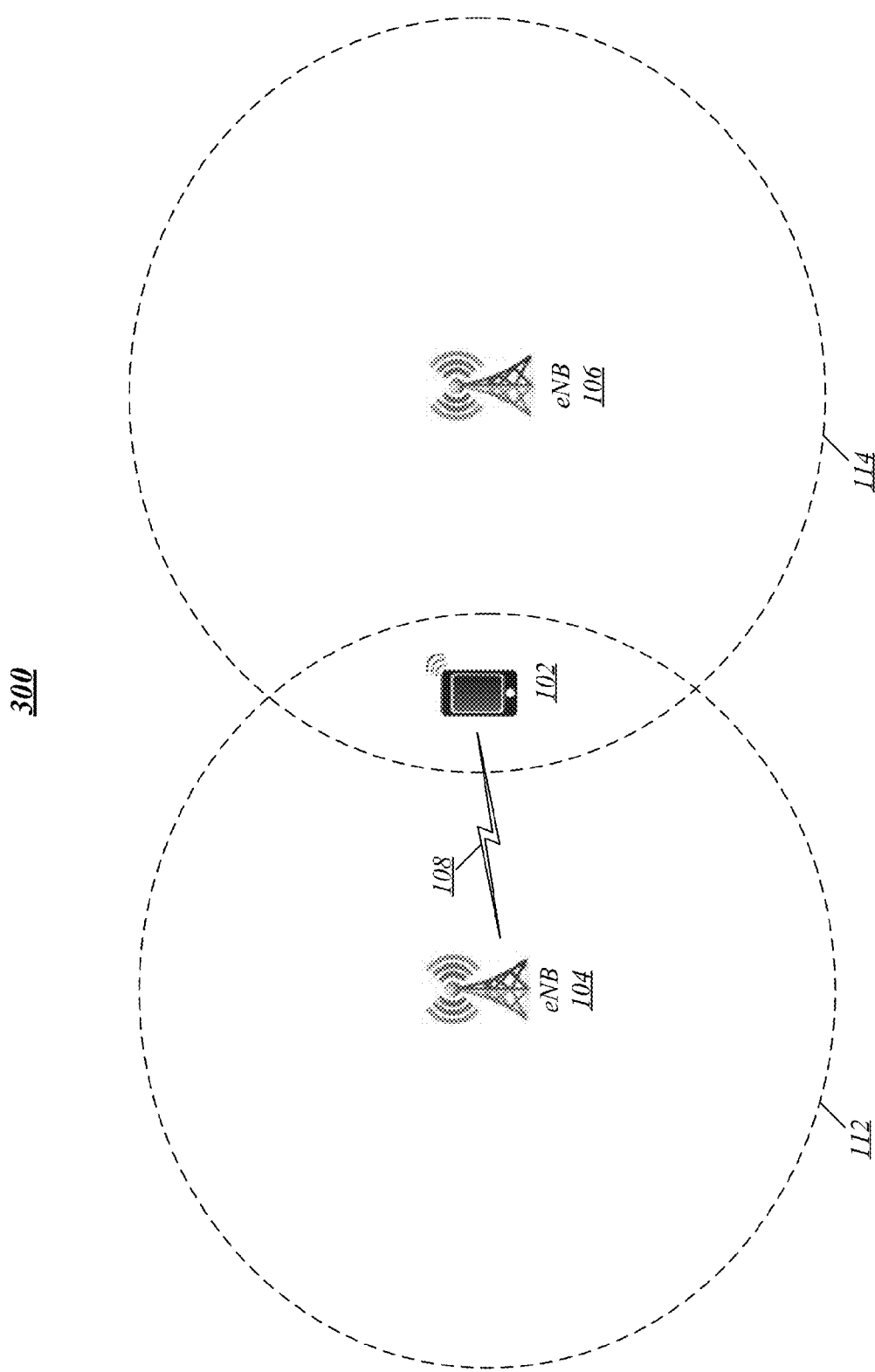
FIG. 3 illustrates an embodiment of a second operating environment.

FIG. 3 illustrates an operating environment 300 such as may be representative of some embodiments. Similar to the operating environment 100, the operating environment 300 can include the mobile device 102 (e.g., the UE 102), the first cellular base station 104 (e.g., eNB 104), and the second cellular base station 106 (e.g., eNB 106). In contrast to the operating environment 100, the operating environment 300 can be such that a CA capable UE 102 cannot simultaneously communicate using CA with the eNB 104 and the eNB 106. As an example, the wireless network infrastructure depicted in the operating environment 300, consisting of at least the eNB 104 and the eNB 106, can be configured to not provide CA communications with a CA capable UE 102. As such, the CA capable UE 102 can communicate over wireless communications interface 108 with the eNB 104 using, for example, the RF chain 204 as depicted in FIG. 2A. In various embodiments, the RF chain 206, and its constituent components Rx chain 206-1 and Tx chain 206-2, can consequently be unused and/or inoperative. While the UE 102 is capable of CA operation, the operating environment 300 is representative of a network operating environment in which UE 102 is not able to do (e.g., because of network limitations, a configuration choice by an operator to not support CA, Scell outages, or Scells not being configured).

Techniques described herein enable a CA capable UE, such as the UE 102, to use an RF chain, such as the secondary RF chain 206, to perform wireless network performance measurements when the RF chain, capable of tuning to a secondary component carrier and/or secondary frequency range, is unused or inoperative in relation to implementing CA. In various embodiments, an Rx chain, for example the Rx chain 206-1 depicted in FIGS. 2A and 2B, which could otherwise be used to support CA, can be reconfigured and/or used to perform measurements relating to a wireless network. The Rx chain 206-1 can be reconfigured after determination that the network does not support CA (e.g., after determining that a second carrier is not capable of providing CA). This Rx chain can be an Rx chain that can be used to communicate with an Scell of a wireless network if the wireless network supported CA and/or the Scell was configured.

Techniques described herein implement wireless network measurements using an unused secondary RF chain. The wireless network measurements can include inter-frequency measurements and inter-radio access technology (RAT) measurements. Inter-frequency measurements can include measurements on downlink physical channels at frequencies that differ from the frequency of the active set maintained by a UE, but within the same RAT. Inter-RAT measurements can include measurements on downlink physical channels belonging to a radio access technology other than the primary radio access technology used by the UE. For example, the primary radio access technology for the UE may be evolved Universal Mobile Telecommunications System Terrestrial Radio Access Network (E-UTRAN) and the inter-RAT measurements may be performed on a GSM network. The types of measurements performed by the UE using the unused secondary RF chain can vary based on the RAT, as each RAT can have define different measurement values and metrics to quantify the networks quality. However, in general, the inter-frequency and intra-RAT measurements can include measures of signal strength (e.g., received signal strength) and signal quality (e.g., received bit error rate (BER) and related measurements indicating variation in received signal quality).

Techniques described herein provide for more efficient operation of a UE by performing network measurements using an unused secondary RF chain. Using the RF chain configured and or operated to communicate with the Pcell can adversely affect throughput, on the downlink and uplink with the UE. As an example, network measurements can require approximately 15% of the downlink resources of the primary RF chain. Since the unused secondary chain is not configured and or operated to provide data communications, there is no impact on system throughput involving the UE and the eNB. Further, the unused secondary RF chain provides more flexibility for scheduling and arranging the measurements.

Techniques described herein provide for a mobile device to indicate to a wireless network that the mobile device includes one or more unused or idle components that can be used to perform network measurements. In various embodiments, the mobile device can be a UE. Further, in various embodiments, the UE can indicate to an eNB that the UE includes a receiver or receiver chain, or any portion thereof, that can be used to perform the network measurements. The receiver or receiver chain, or any portion thereof, can be used to communicate with the wireless network but can be unused, idle and/or inactive when the wireless network does not provide a second eNB for data communication (e.g., the wireless network does not provide or is not configured to provide the UE with a Scell and/or a secondary carrier signal). In various embodiments, the UE can be a CA capable UE that operates within a portion of a network that does not support CA and/or does not provide the UE with a secondary component carrier from a second eNB for data communication. Accordingly, in accordance with the techniques described herein, the UE can indicate the ability to use the unused and/or inactive secondary components for the purpose of network measurements.

Techniques described herein provide the eNB and the UE to negotiate or provision the performance of the network measurements. In various embodiments, the UE can accept or rejection suggested measurement provisioning by the eNB until the eNB provide parameters for the measurements that are accepted by the UE. Further, in various embodiments, the UE can perform the network measurements using the unused and/or inactive secondary receiver and/or receiver chain and can determine any disruptions to any other included receiver and/or receiver chain that is actively communication with the wireless network (e.g., disruptions to the operation of a primary receive or receiver chain).

Figure 4:
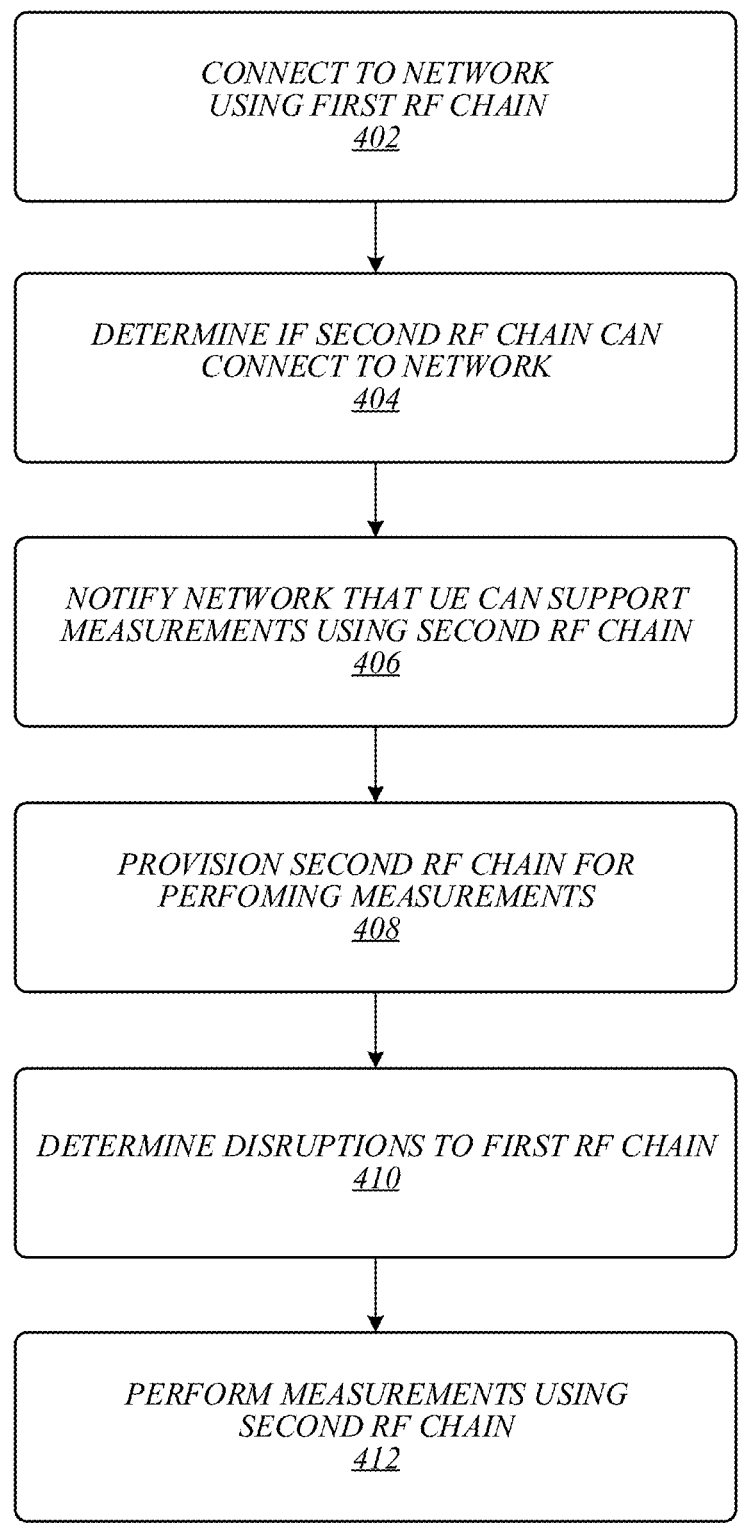
FIG. 4 illustrates an embodiment of a first message flow.

FIG. 4 illustrates one embodiment of a logic flow 400, which may be representative of the operations executed by one or more embodiments described herein. More particularly, logic flow 400 may be representative of operations that may be performed in some embodiments by UE 102. As shown in logic flow 400, at 402, a mobile device can connect to a wireless network. The mobile device can be a UE. The UE can connect to a 3GPP and/or an LTE wireless network by communicating with an eNB. The UE can communicate with the eNB using a first RF chain (e.g., a primary RF chain). Data communications can be established between the UE and the eNB. The first RF chain can include a transmitter and a receiver. The first RF chain can be configured to communicate with the eNB over a first carrier frequency and/or first frequency range. The UE can include one or more additional RF chains (e.g., one or more secondary RF chains) to establish data communicate with one or more additional eNBs. Communication with the one or more additional eNBs can be substantially simultaneous with the communications with the first eNB using the first RF chain. The UE can be a CA capable UE. One or more components can be shared between the RF chains of the UE. At 402, the UE can be communicating with an eNB that is considered to be operating as a Pcell and can provide communications over a primary component carrier.

At 404, the UE can determine if any additional eNBs of the wireless network are available. The UE can determine at 404 if CA communications are possible with the wireless network by communicating with one or more additional eNBs over one or more secondary component carriers and/or corresponding secondary frequency ranges. At 404, the UE can determine if one or more of its secondary RF chains can be used to provide CA communications with one more eNBs. During this process, the UE can determine that the wireless network does not support CA. As an example, the wireless network can indicate that it is not configured for CA or for a Scell. Accordingly, the UE can determine that one or more secondary RF chains, or any portion thereof, will not be used and/or configured for implementation of CA with the wireless network. The UE can then further determine that one or more of these secondary RF chains, or any portion thereof, can be used to perform wireless network measurements (as opposed performing the network measurements using the primary RF chain engaged in communications with the wireless network through the eNB).

At 406, the UE can indicate that it includes capabilities to use an additional or secondary RF chain to perform network measurements. The UE can notify the wireless network, through communications with the eNB it is in operative communications with, that one or more secondary RF chains that are currently not being used to communication with the network can be used for network measurements. The UE can indicate that it is a CA capable UE. The UE can indicate the number of secondary RF chains available to the UE. The eNB can receive these indications and/or messages from the UE.

At 408, parameters for performing the network measurements using a secondary RF chain of the UE can be determined. The UE and the eNB can negotiate parameters for performing the measurements. In various embodiments, the eNB can provide one or more messages to the UE with first parameters for performing the measurements. The UE can accept or reject the first parameters from the eNB. Upon notification that the first parameters are rejected by the eNB, the eNB can provide the UE with second parameters for performing the measurements. Again, the UE can accept or reject the second parameters from the eNB. This process can continue until parameters for the measurements are determined as acceptable by the UE. Alternatively, or in addition thereto, in various embodiments, the UE can provide one or more messages to the eNB with suggested parameters for the measurements. Parameters for performing the measurements can be determined once both the eNB and the UE accept the parameters or if the UE or eNB accepts suggested parameters from the other entity. Once parameters for the measurements are determined, the UE can configure the second RF chain—and in particular, a second receiver and/or receiver chain—for performing the measurements. In various embodiments, the parameters can include the length of the measurements, how frequently the measurements are performed, and/or how the measurement results are reported.

At 410, based on the provisioning of the second RF chain for the performance of the measurements, the UE can determine any effect the measurements will have on operation of the first or primary RF chain. The UE can adjust operation of the first RF chain to minimize any disruptions to the primary RF chain as a result of performing network measurements using the secondary RF chain. The determined disruptions can include determining when operation of the primary RF chain will be temporarily stopped or halted (e.g., receiving or transmitting operations can be paused) based on when the measurements are performed.

At 412, the UE can perform the network measurements. The network measurement can be implemented using the secondary RF chain, and in particular, the receiver and/or receiver chain associated with the secondary RF chain. Operation of the primary RF chain can be managed and adjusted during performance of the measurements. The measurements can include inter-frequency measurements and/or inter-RAT measurements. The UE can also report the result of the measurements to the eNB over the data communications link that uses the primary RF chain of the UE.

Figure 5:
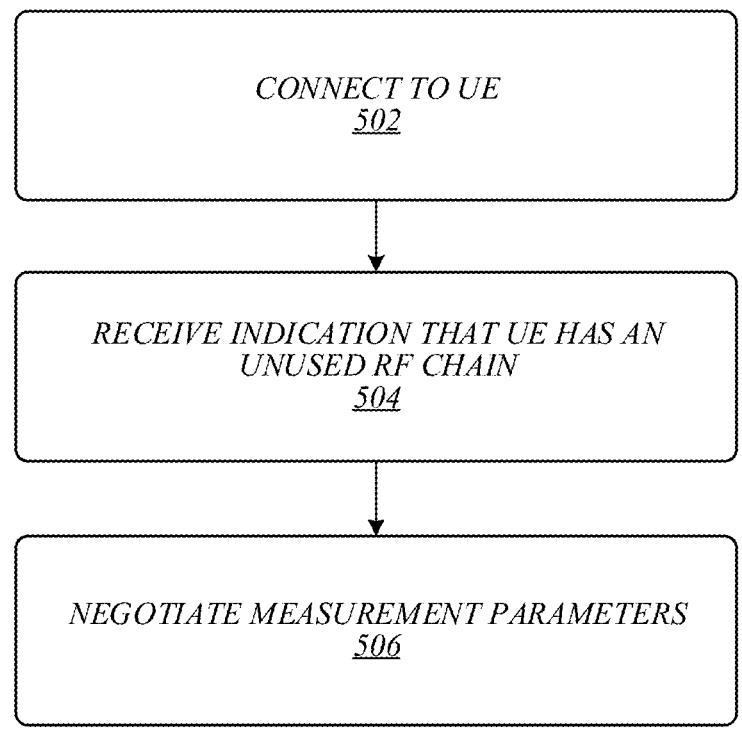
FIG. 5 illustrates an embodiment of a second message flow.

FIG. 5 illustrates one embodiment of a logic flow 500, which may be representative of the operations executed by one or more embodiments described herein. More particularly, logic flow 500 may be representative of operations that may be performed in some embodiments by eNB 104. As shown in logic flow 500, at 502, an eNB can be communicatively connected to a UE to provide data communications. The eNB and the UE can communicate over a wireless data communications link. Step 502 can correspond to step 402 of FIG. 4.

At 504, the eNB can receive and process and indication from the UE that the UE is a CA capable UE. The indication from the UE can indicate that the UE includes one or more RF chains that are currently not being used for CA. The indication from the UE can indicate that the UE can perform network measurements using one or more of the RF chains that are currently not being used for CA. Step 504 can correspond to step 406 of FIG. 4.

At 506, the eNB can negotiate one or more parameters for implementing the network measurements by the UE. In various embodiments, the eNB can select the parameters and can provide the selected parameters to the UE. The UE can then accept or reject the parameters from the UE. Alternatively, the UE can be configured to accept any selected parameters from the eNB without being able to reject any selected parameters from the eNB. If selected parameters are rejected by the UE, the eNB can receive a message from the UE indicating as much. The eNB can then resend new or additional or updated parameters. This process can be repeated until the UE accepts parameters from the eNB. In various embodiments, the UE can provide suggested parameters for the measurements to the eNB for approval. The eNB can accept or reject these suggested parameters from the UE. Step 506 can correspond to step 408 of FIG. 4. Parameters for implementing the measurements can be determined once the UE and eNB accept the proposed parameters. Once parameters for the measurements have been determined, the UE can perform the network measurements based on the negotiated and/or provisioned parameters. The eNB can subsequently receive one or messages form the UE reporting the results of the network measurements.

Figure 6:
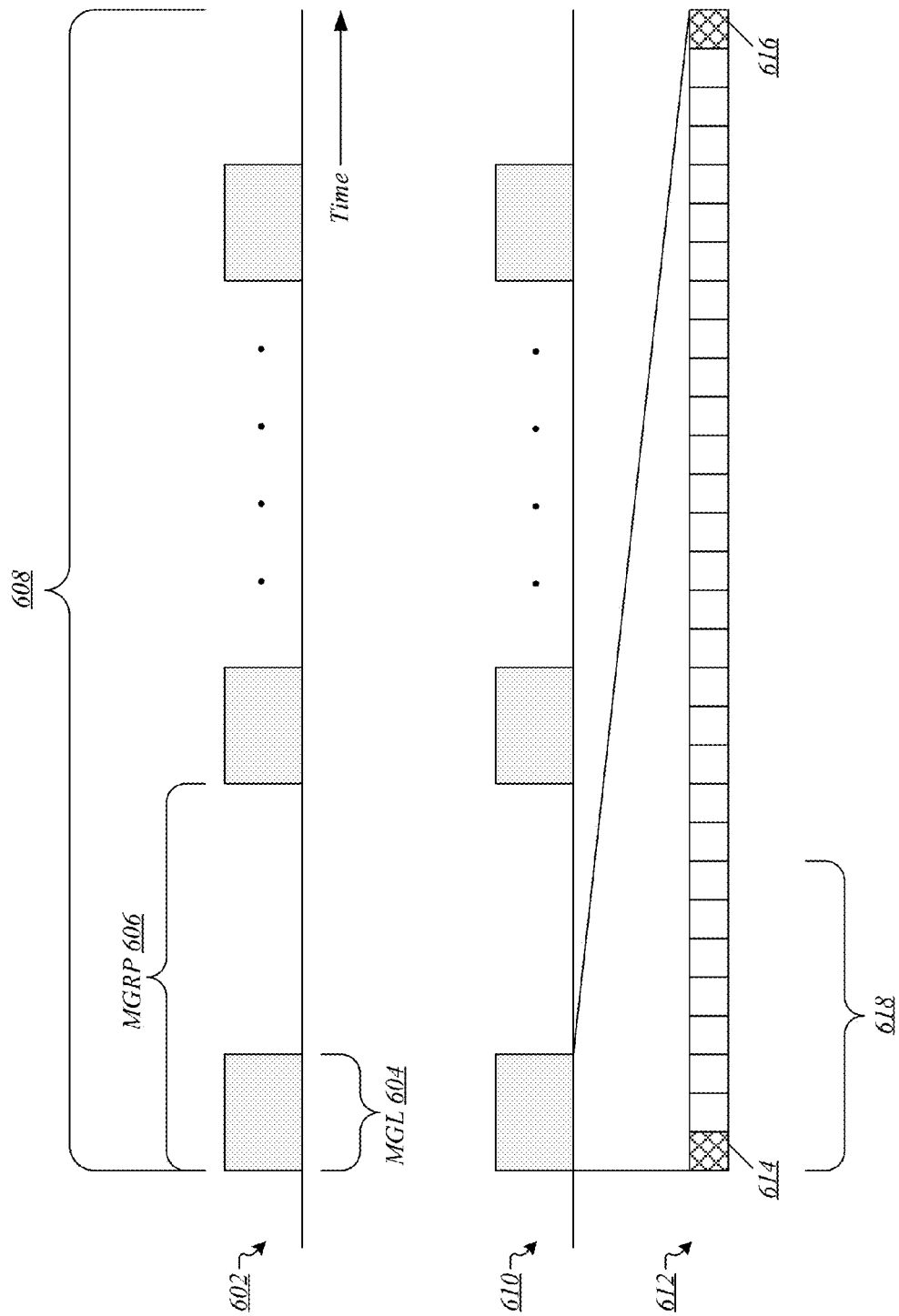
FIG. 6 illustrates exemplary measurement parameters.

FIG. 6 illustrates coordination of network measurements using an unused secondary Rx chain 602 such as may be representative of some embodiments. As shown in FIG. 6, operation of an unused secondary Rx chain 602 is shown relative to operation of an active primary RF chain 610. The operation of the unused secondary Rx chain 602 can be, for example, representative of the operation of the receiver and/or receiver chain 206-1 depicted in FIG. 2A and/or any of the constituent components depicted in FIG. 2B. The unused secondary Rx chain can be a portion of a receiver and/or receiver chain for use in communicating with a Scell. The primary RF chain 610 can be a portion of RF chain (e.g., a transmitting portion and or a receiver portion, or any component thereof) for use in communicating with a Pcell.

FIG. 6 illustrates various parameters related to network measurements that can be performed by the unused secondary Rx chain 602. A measurement gap length (MGL) 604 can represent a period of time during which the unused secondary Rx chain 602 performs a network measurement (e.g., a period of time the Rx chain 602 receives RF signals). During the MGL 604, the unused secondary Rx chain 602 can be operated to implement network measurements. Measurements can be repeated over time as represented by periodic repetition of the MGL 604 as illustrated in FIG. 6. The repetition of the MGL 604 can be specified by a measurement gap repetition period (MGRP) 606. The MGL 604 and the MGRP 606 can specify times during which the unused secondary Rx chain 602 can be scheduled to perform network measurements.

The duration of MGL 604 and the duration of MGRP 606 can be varied. The amount of time for MGL 604 and MGRP 606 can be negotiated by the UE and the eNB. Further, the MGL 604 and the MGRP 606 can be specified relative to a predetermined amount of time 608. In various embodiments, the predetermined amount of time 608 can be 480 milliseconds. By varying MGL 604 and MGRP 606, the amount of time for network measurement can be varied along with the total amount of time for network measurements within the predetermined amount of time 608.

FIG. 6 further illustrates timing for altering operations of the primary RF chain 610 based on the implementation of network measurements by the secondary Rx chain 602. As shown in FIG. 6, the MGL 604 can include a sequence of subframes 612. The duration of each subframe 612 can be fixed. The MGL 604 can be set to occupy an amount of time corresponding to any number of subframes 612. As an example, FIG. 6 illustrates the MGL 604 occupying an amount of time corresponding to thirty (30) subframes 612. The subframe sequence 612 can represent individual allocations of time for the RF chain 610 to operate. As an example, each of the subframes in the sequence 612 can represent a subframe allocated for transmission or reception operations by the RF chain 610.

Subframe 614 can correspond to the first subframe within the subframe sequence 612. Subframe 616 can correspond to the last subframe within the subframe sequence 612. The first subframe 614 can represent a time when the unused secondary Rx chain 602 is powered up or turned on. As this operation can interfere with RF signals transmitted or received by the RF chain 610, the RF chain 610 can be prevented from operating during the subframe time period 614 (and/or during subframe time periods around this subframe time period 614). Additionally, the last subframe time period 616 can represent a time when the unused Rx chain 602 is powered down or turned off. Similarly, as this operation can interfere with RF signals transmitted or received by the RF chain 610, the RF chain 610 can be prevented from operating during the subframe time period 616 (and/or during subframe time periods around this subframe time period 616). The first and last subframe time periods 614 and 616 can each be considered to be short measurement gaps, which can specify when adjustment to operation of the Pcell RF chain 610 may be implemented to reduce possible interference.

The MGL 604 and the MGRP 606 are parameters for performing network measurements by the Rx chain 610 that can be negotiated or provisioned between a UE and a eNB (such as, for example, in step 408 of FIG. 4 and/or in step 506 of FIG. 5).

In various embodiments, the MGL 604 can be determined or set according to:

$$MGL = N \times 5 \text{ ms} + 1 \text{ ms}$$

where N is a positive integer. Further, in various embodiments, the MGRP 606 can be determined or set according to:

$$MGRP = \frac{480 \text{ ms}}{M}$$

where M is a positive integer.

FIG. 7 illustrates exemplary possible configurations 700 for MGL and MGRP as depicted in relation to FIG. 6. The exemplary configurations can be specified by a gap pattern identification (ID) as shown in FIG. 7. A first configuration 702 can correspond to a gap pattern ID value of "0," and can specify a MGL of 6 ms and a MGRP of 40 ms. A minimum amount of measurement time over a period of 480 ms ("Tinted") can be 60 ms with the first configuration 702. This minimum amount of measurement time can be determined according to:

$$Tinter1 = \frac{(MGL - 1) \times 480 \text{ ms}}{MGRP}$$

A second configuration 704 can correspond to a gap pattern ID value of "1," and can specify a MGL of 6 ms and a MGRP of 80 ms. A minimum amount of measurement time over a period of 480 ms can be 30 ms with the second configuration 704.

A third configuration 706 can correspond to a gap pattern ID value of "2," and can specify a MGL of 31 ms and a MGRP of 120 ms. A minimum amount of measurement time over a period of 480 ms can be 120 ms with the third configuration 706.

A fourth configuration 708 can correspond to a gap pattern ID value of "3," and can specify a MGL of 16 ms and a MGRP of 120 ms. A minimum amount of measurement time over a period of 480 ms can be 120 ms with the fourth configuration 708.

The gap pattern IDs shown in FIG. 7 can be used in communications between a UE and a eNB to identify a particular configuration of the MGL and the MGRP. As an example, the gap pattern IDS shown in FIG. 7 can be a parameter exchanged between a UE and a eNB in step 408 of FIG. 4 and/or step 506 of FIG. 5 as part of negotiations for performing wireless network measurement using an unused secondary Rx chain of a CA capable UE.

A further parameter that can specify configuration of network measurements using an unused secondary Rx chain can be a gap offset. The gap offset can specify a starting point of a first measurement gap relative to a sequence of subframes. As an example, the first measurement gap 614 can be positioned within the first subframe of the sequence 612, thereby corresponding to a gap offset of zero. An exemplary non-zero gap offset 618 is shown in FIG. 6. The non-zero gap offset 618 can specify the timing of the first measurement gap relative to the sequence 612. The gap offset can adjust the positioning of the MGL 604 block as shown in FIG. 6 by correspondingly adjusting the position of the last measurement gap 616 and therefore the end of the MGL 604.

The gap offset can be specified using an information element, for example, a MeasGapConfig information element. The gap offset can vary based on a particular specified gap pattern ID. For a particular gap pattern ID, the minimum gap offset can 0 and the maximum gap offset can be a value that is less than the MGRP for the gap pattern ID. For example, for a gap pattern ID of "0" corresponding to configuration 702 depicted in FIG. 7, the gap offset can take on an integer value between 0 and 39. For a gap pattern ID of "1" corresponding to configuration 704 depicted in FIG. 7, the gap offset can take on an integer value between 0 and 79. For a gap pattern ID of "2" corresponding to configuration 706 depicted in FIG. 7, the gap offset can take on an integer value between 0 and 119. For a gap pattern ID of "3" corresponding to configuration 708 depicted in FIG. 7, the gap offset can take on an integer value between 0 and 39.

Based on a determined MGL, MGRP (e.g., as specified by a gap pattern ID), and a gap offset (e.g., as specified in a MeasGapConfig information element, the timing of network measurements by an unused secondary Rx chain can be implemented. Further, the short measurement gaps associated with the configured network measurements can be determined such that adjustments to operation of an active primary RF chain can be implemented.

Figure 8:
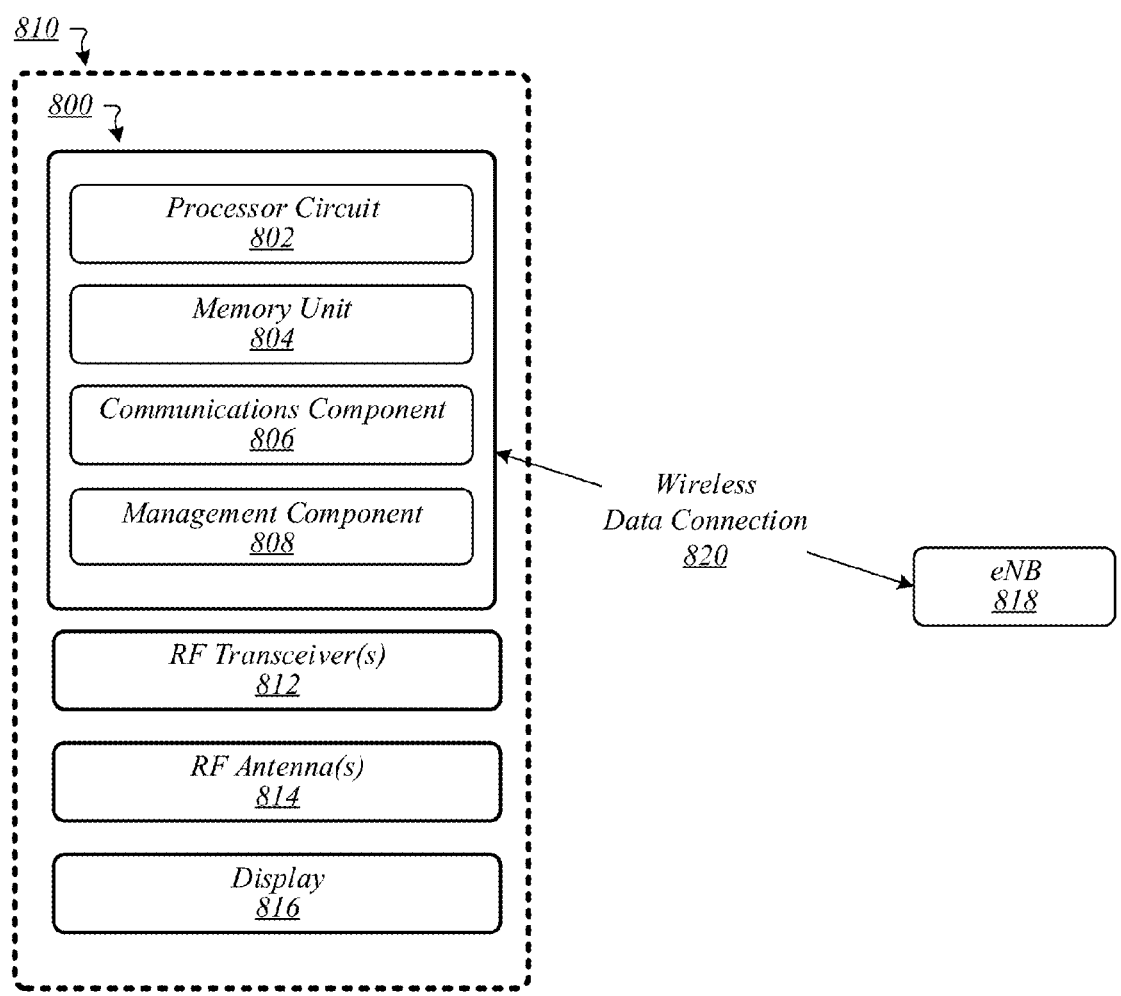
FIG. 8 illustrates an embodiment of a first apparatus and an embodiment of a first system.

FIG. 8 illustrates a block diagram of an apparatus 800. Apparatus 800 may be representative of a UE (e.g., UE 102) that implements techniques for performing network measurements using an unused secondary receiver and/or receiver chain. As such, apparatus 800 may implement portions of the message flow 400 described in relation to FIG. 4. As shown in FIG. 8, apparatus 800 can comprise multiple elements including a processor circuit 802, a memory unit 804, a communications component 806, and a management component 808. The embodiments, however, are not limited to the type, number, or arrangement of elements shown in this figure.

In some embodiments, apparatus 800 may comprise processor circuit 802. Processor circuit 802 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 802 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 802 may be implemented as a general purpose processor, such as a processor made by Intel® Corporation, Santa Clara, Calif. The embodiments are not limited in this context.

In various embodiments, apparatus 800 may comprise or be arranged to communicatively couple with a memory unit 804. Memory unit 804 may be implemented using any machine-readable or computer-readable media capable of storing data, including both volatile and non-volatile memory. For example, memory unit 804 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 804 may be included on the same integrated circuit as processor circuit 802, or alternatively some portion or all of memory unit 804 may be disposed on an integrated circuit or other medium, for example a hard disk drive, that is external to the integrated circuit of processor circuit 802. Although memory unit 804 is comprised within apparatus 800 in FIG. 8, memory unit 804 may be external to apparatus 800 in some embodiments. The embodiments are not limited in this context.

In various embodiments, apparatus 800 may comprise a communications component 806. Communications component 806 may comprise logic, circuitry, and/or instructions operative to send messages to one or more remote devices and/or to receive messages from one or more remote devices. In some embodiments, communications component 806 may be operative to send and/or receive messages over one or more wired connections, one or more wireless connections, or a combination of both. In various embodiments, communications component 806 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 800 may comprise a management component 808. Management component 808 may comprise logic, circuitry, and/or instructions operative to manage functional operations of the apparatus 800 including directing the communications component 806 to generate and transmit messages and/or to receive and process messages. The embodiments are not limited in this context.

FIG. 8 also illustrates a block diagram of a system 810. System 810 may comprise any of the aforementioned elements of apparatus 800. System 810 may further comprise one or more radio frequency (RF) transceivers 812. RF transceivers 812 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceivers 812 may operate in accordance with one or more applicable standards in any version. As an example, RF transceivers 812 can implement the RF front end depicted in FIG. 2A and can include the Rx chain 206-1 depicted in FIG. 2B. The RF transceivers 812 can include one or more RF chains such that a primary RF chain can communicate with a Pcell eNB and at least one secondary RF chain can communicate with an Scell eNB. The secondary RF chain can implement wireless network measurements are described herein when not configured or operated to communicate using CA. In various embodiments, the primary and one or more secondary RF chains of the RF transceivers 812 can be implemented on a single integrated circuit. The embodiments are not limited in this context.

In various embodiments, system 810 may comprise one or more RF antennas 814. Examples of any particular RF antenna 814 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceivers 812 may be operative to send and/or receive messages and/or data using one or more RF antennas 814. The embodiments are not limited in this context.

In various embodiments, system 810 may comprise a display 816. Display 816 may comprise any display device capable of displaying information received from processor circuit 802. Examples for display 816 may include a television, a monitor, a projector, and a computer screen. In one embodiment, for example, display 816 may be implemented by a liquid crystal display (LCD), light emitting diode (LED) or other type of suitable visual interface. Display 816 may comprise, for example, a touch-sensitive display screen ("touchscreen"). In some implementations, display 816 may comprise one or more thin-film transistors (TFT) LCD including embedded transistors. The embodiments, however, are not limited to these examples.

In various embodiments, communications component 806 may be operative to transmit and receive messages with an eNB 818. The eNB 818 can be representative of the eNB 104 depicted and described in relation to FIGS. 1 and 3. Communication with the eNB 818 can be implemented over a wireless data connection 820 in accordance with one or more cellular communication protocols as described herein. In various embodiments, the communications component 806 can generate and transmit messages and can receive and process messages under direction of the management component 808 to implement the message flow 400 depicted in FIG. 4.

In various embodiments, the management component 808 can manage operation of the apparatus 800 and/or the system 810 to implement performance of wireless network measurements using a secondary receiver chain. The management component 808 can manage the message flow 400 depicted in FIG. 4 and can perform the determining and negotiation steps described therein. The management can manage the multiple RF transceivers 812 including implementing a first RF chain for communicating with a wireless network and configuring a second RF chain to perform wireless network measurements as described herein.

Figure 9:
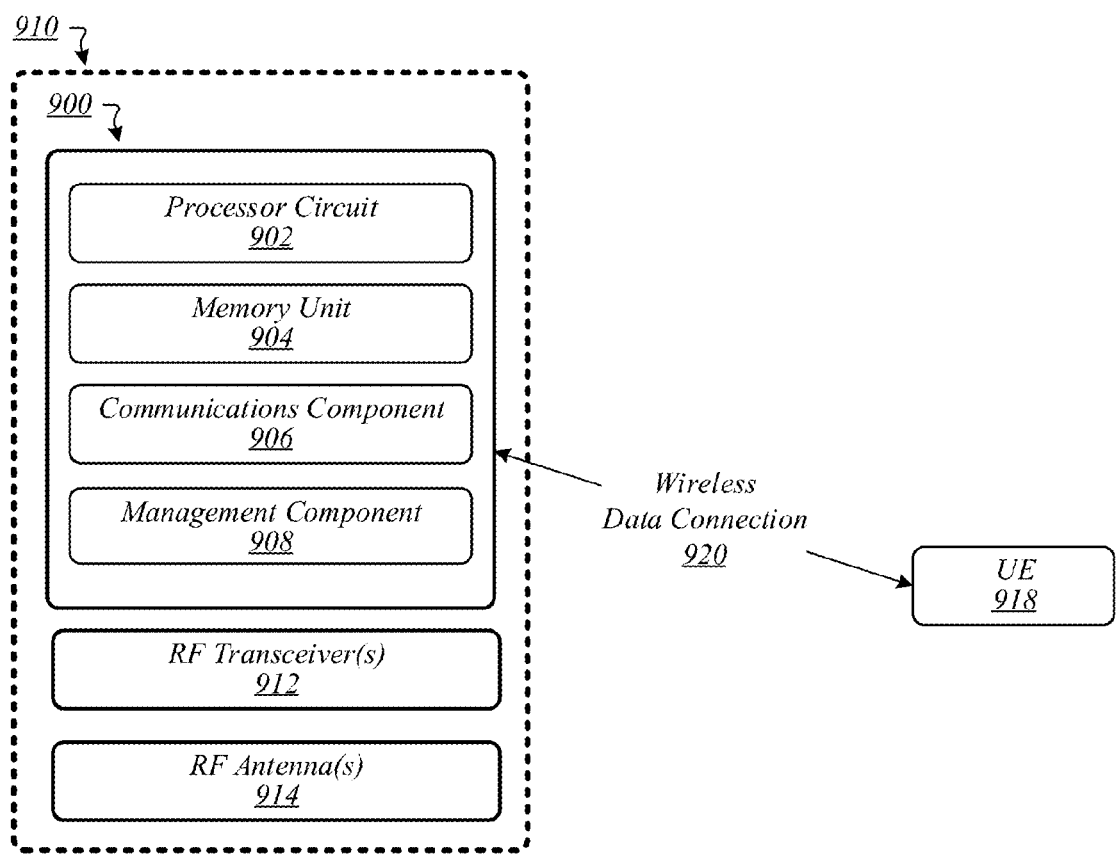
FIG. 9 illustrates an embodiment of a second apparatus and an embodiment of a second system.

FIG. 9 illustrates a block diagram of an apparatus 900. Apparatus 900 may be representative of an eNB (e.g., eNB 104) that implements techniques for performing network measurements using an unused secondary receiver and/or receiver chain of a CA capable UE. As such, apparatus 900 may implement portions of the message flow 500 described in relation to FIG. 5. As shown in FIG. 9, apparatus 900 can comprise multiple elements including a processor circuit 902, a memory unit 904, a communications component 906, and a management component 908. The embodiments, however, are not limited to the type, number, or arrangement of elements shown in this figure.

In some embodiments, apparatus 900 may comprise processor circuit 902. Processor circuit 902 may be implemented using any processor or logic device, such as a complex instruction set computer (CISC) microprocessor, a reduced instruction set computing (RISC) microprocessor, a very long instruction word (VLIW) microprocessor, an x96 instruction set compatible processor, a processor implementing a combination of instruction sets, a multi-core processor such as a dual-core processor or dual-core mobile processor, or any other microprocessor or central processing unit (CPU). Processor circuit 902 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 902 may be implemented as a general purpose processor, such as a processor made by Intel® Corporation, Santa Clara, Calif. The embodiments are not limited in this context.

In various embodiments, apparatus 900 may comprise or be arranged to communicatively couple with a memory unit 904. Memory unit 904 may be implemented using any machine-readable or computer-readable media capable of storing data, including both volatile and non-volatile memory. For example, memory unit 904 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 904 may be included on the same integrated circuit as processor circuit 902, or alternatively some portion or all of memory unit 904 may be disposed on an integrated circuit or other medium, for example a hard disk drive, that is external to the integrated circuit of processor circuit 902. Although memory unit 904 is comprised within apparatus 900 in FIG. 9, memory unit 904 may be external to apparatus 900 in some embodiments. The embodiments are not limited in this context.

In various embodiments, apparatus 900 may comprise a communications component 906. Communications component 906 may comprise logic, circuitry, and/or instructions operative to send messages to one or more remote devices and/or to receive messages from one or more remote devices. In some embodiments, communications component 906 may be operative to send and/or receive messages over one or more wired connections, one or more wireless connections, or a combination of both. In various embodiments, communications component 906 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 900 may comprise a management component 908. Management component 908 may comprise logic, circuitry, and/or instructions operative to manage functional operations of the apparatus 900 including directing the communications component 906 to generate and transmit messages and/or to receive and process messages. The embodiments are not limited in this context.

FIG. 9 also illustrates a block diagram of a system 910. System 910 may comprise any of the aforementioned elements of apparatus 900. System 910 may further comprise one or more radio frequency (RF) transceivers 912. RF transceivers 912 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceivers 912 may operate in accordance with one or more applicable standards in any version. The embodiments are not limited in this context.

In various embodiments, system 910 may comprise one or more RF antennas 914. Examples of any particular RF antenna 914 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceivers 912 may be operative to send and/or receive messages and/or data using one or more RF antennas 914. The embodiments are not limited in this context.

In various embodiments, communications component 906 may be operative to transmit and receive messages with a UE 918. The UE 918 can be representative of the UE 102 depicted and described in relation to FIGS. 1 and 3. Communication with the eNB 918 can be implemented over a wireless data connection 920 in accordance with one or more cellular communication protocols as described herein. In various embodiments, the communications component 906 can generate and transmit messages and can receive and process messages under direction of the management component 908 to implement the message flow 500 depicted in FIG. 5.

In various embodiments, the management component 908 can manage operation of the apparatus 900 and/or the system 910 to implement performance of wireless network measurements using a secondary receiver chain of the UE 918. The management component 908 can manage the message flow 500 depicted in FIG. 5 and can perform the determining and negotiation steps described therein.

Figure 10:
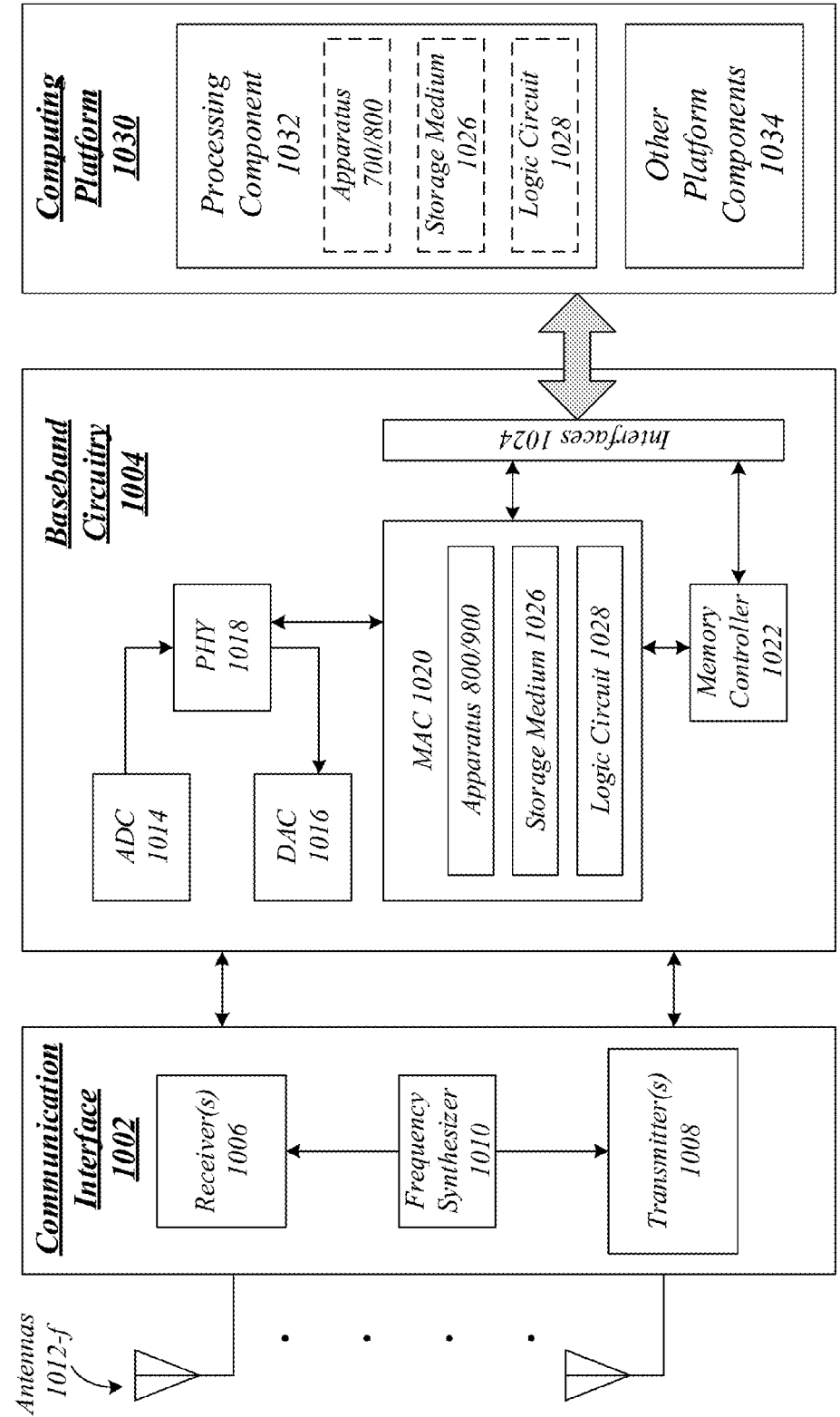
FIG. 10 illustrates an embodiment of a device.

FIG. 10 illustrates an embodiment of a communications device 1000 that may implement one or more of apparatus 800 and/or system 810 of FIG. 8, apparatus 900 and/or system 910 of FIG. 9, and/or may implement portions of the message flows 400 and/or 500 as described in relation to FIGS. 4-5.

As shown in FIG. 10, the communications device 1000 can include a storage medium 1026. The storage medium 1026 may comprise any non-transitory computer-readable storage medium or machine-readable storage medium, such as an optical, magnetic or semiconductor storage medium. In various embodiments, the storage medium 1026 may comprise an article of manufacture. In some embodiments, the storage medium 1026 may store computer-executable instructions, such as computer-executable instructions to implement one or more of the operations described in relation to one or more of apparatus 800 and/or system 810 of FIG. 8, apparatus 900 and/or system 910 of FIG. 9, and/or may implement portions of the message flows 400 and/or 500 as described in relation to FIGS. 4-5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

In various embodiments, device 1000 may comprise a logic circuit 1028. The logic circuit 1028 may include physical circuits to perform operations described for one or more of apparatus 800 and/or system 810 of FIG. 8, apparatus 900 and/or system 910 of FIG. 9, storage medium 1026, and/or may implement portions of the message flows 400 and/or 500 as described in relation to FIGS. 4-5. As shown in FIG. 10, device 1000 may include a communication interface 1002, baseband circuitry 1004, and computing platform 1030, although the embodiments are not limited to this configuration.

The device 1000 may implement some or all of the aforementioned structure and/or operations in a single computing entity, such as entirely within a single device. Alternatively, the device 1000 may distribute portions of the aforementioned structure and/or operations across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, communication interface 1002 may include a component or combination of components adapted for transmitting and receiving communication messages over one or more wired or wireless interfaces according to one or more communication standard protocols. As an example, the communications interface 1002 may be a radio interface and may be include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. The communications interface 1002 may include, for example, receivers 1006 and transmitters 1008. As a radio interface, the communications interface 1002 may also include a frequency synthesizer 1010. As a radio interface, the communications interface 1002 may include bias controls, a crystal oscillator and/or one or more antennas 1012-*f*. In another embodiment as a radio interface, the communications interface 1002 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1004 may communicate with communications interface 1002 to process, receive and/or transmit signals. The baseband circuitry 1004 may include an analog-to-digital converter (ADC) 1014 and a digital-to-analog converter (DAC) 1016. In some embodiments for the communications interface 1202 implemented as a radio interface, the ADC 1014 can be used for down converting received signals and the DAC 1016 can be used for up converting signals for transmission. The circuitry 1004 may include a baseband or physical layer (PHY) processing circuit 1018 for PHY link layer processing of respective receive/transmit signals. The circuitry 1004 may include, for example, a medium access control (MAC) processing circuit 1020 for MAC/data link layer processing. The circuitry 1004 may include a memory controller 1022 for communicating with MAC processing circuit 1020 and/or a computing platform 1030, for example, via one or more interfaces 1024.

In some embodiments, PHY processing circuit 1018 may include a frame construction and/or detection module, in combination with additional circuitry such as a buffer memory, to construct and/or deconstruct communication frames. Alternatively or in addition, MAC processing circuit 1020 may share processing for certain of these functions or perform these processes independent of PHY processing circuit 1018. In some embodiments, MAC and PHY processing may be integrated into a single circuit.

The computing platform 1030 may provide computing functionality for the device 1000. As shown, the computing platform 1030 may include a processing component 1032. In addition to, or alternatively of the circuitry 1004, the device 1000 may execute processing operations or logic for one or more of apparatus 800 and/or system 810 of FIG. 8, apparatus 900 and/or system 910 of FIG. 9, storage medium 1026, logic circuit 1028, and/or may implement portions of the message flows 400 and/or 500 as described in relation to FIGS. 4-5, using the processing component 1032.

The processing component 1032 (and/or PHY 1018 and/or MAC 1020) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1034. Other platform components 1034 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, eNB, UE, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1012-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
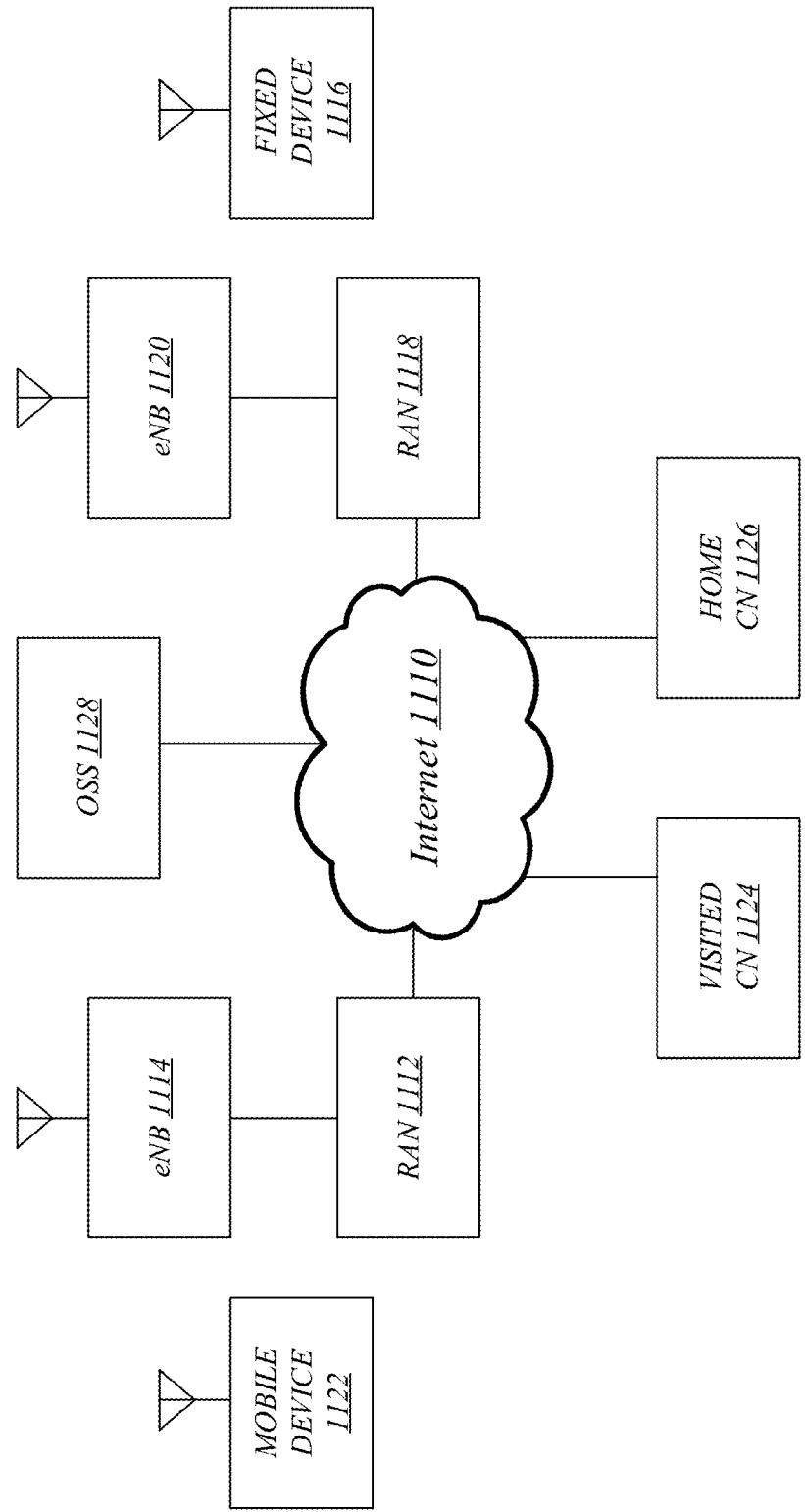
FIG. 11 illustrates an embodiment of a wireless network.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.11 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1200 of FIG. 12, with the fixed device 1116 comprising a stationary version of device 1200 and the mobile device 1122 comprising a mobile version of device 1200. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1200, and may comprise, for example, the PHY and MAC layer equipment in compliance with a 3GPP LTE Specification or an IEEE 802.11 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following first set of examples pertain to further embodiments:

Example 1 is a user equipment (UE), comprising a primary radio frequency (RF) chain, a secondary RF chain including a secondary receiver chain, and logic, at least a portion of which is in hardware, to manage wireless data communications using the primary RF chain and to perform wireless network measurements using the secondary receiver chain.

Example 2 is ab extensions of Example 1, the logic to determine that the wireless network does not support carrier aggregation and to configure the secondary receiver chain to perform a wireless network measurement.

Example 3 is an extension of Example 1, wherein the wireless network measurement comprises an inter-frequency measurement.

Example 4 is an extension of Example 1, wherein the wireless network measurement comprises an inter-radio access technology (RAT) measurement.

Example 5 is an extension of Example 1, wherein the wireless network measurement comprises determining a received signal strength.

Example 6 is an extension of Example 1, wherein the wireless network measurement comprises determining a received signal quality.

Example 7 is an extension of Example 6, wherein the wireless network measurement comprises determining a variability of the received signal quality.

Example 8 is an extension of Example 1, wherein the UE is a carrier aggregation capable UE.

Example 9 is an extension of Example 1, wherein the primary and secondary RF chains share one or more components.

Example 10 is an extension of Example 1, the logic to configure the secondary receiver chain to perform the wireless network measurement based on a measurement gap length (MGL).

Example 11 is an extension of Example 1, the logic to configure the secondary receiver chain to perform the wireless network measurement based on a measurement gap repetition period (MGRP).

Example 12 is an extension of Example 1, the logic to configure the secondary receiver chain to perform the wireless network measurement based on a measurement gap offset.

Example 13 is an extension of Example 1, the logic to adjust operation of the primary RF chain based on the configuration of the secondary receiver chain to perform the wireless network measurement.

Example 14 is an extension of Example 1, the secondary receiver chain comprising at least one of a bandpass filter, a low noise amplifier, a mixer, a tuner, and an analog-to-digital converter.

Example 15 is a system, comprising a UE according to any of examples 1 to 14 and a display.

Example 16 is a method comprising tuning a primary radio frequency (RF) chain to a first carrier frequency, providing data communications using the first RF chain, determining a wireless network does not provide for carrier aggregation, and configuring a secondary receiver of a secondary RF chain to perform wireless network measurements.

Example 17 is an extension of Example 16, further comprising generating a message indicating carrier aggregation capability.

Example 18 is an extension of Example 16, wherein tuning further comprises adjusting a frequency of a primary reference signal.

Example 19 is an extension of Example 16, wherein providing data communications further comprises transmitting and receiving RF communications using the primary RF chain.

Example 20 is an extension of Example 16, further comprising receiving a measurement parameter.

Example 21 is an extension of Example 20, further comprising rejecting the received parameter.

Example 22 is an extension of Example 20, wherein configuring further comprises configuring the secondary receiver chain based on the received measurement parameter.

Example 23 is an extension of Example 20, wherein receiving the measurement parameter further comprises receiving a measurement gap length (MGL).

Example 24 is an extension of Example 20, wherein receiving the measurement parameter further comprises receiving a measurement gap repetition period (MGRP).

Example 25 is an extension of Example 16, wherein receiving the measurement parameter further comprises receiving a measurement gap offset.

Example 26 is an extension of Example 20, further comprising determining a measurement gap based on the received measurement parameter.

Example 27 is an extension of Example 16, further comprising adjusting operation of the primary RF chain based on the configuration of the secondary RF chain.

Example 28 is an extension of Example 16, further comprising performing an inter-frequency measurement.

Example 29 is an extension of Example 16, further comprising performing an inter-radio access technology (RAT) measurement.

Example 30 is an extension of Example 16, further comprising determining a received signal strength.

Example 31 is an extension of Example 16, further comprising determining a received signal quality.

Example 32 is an extension of Example 31, further comprising determining a variability of the received signal quality.

Example 33 is at least one non-transitory computer-readable storage medium comprising a set of instructions that, in response to being executed on a computing device, cause the computing device to perform a method according to any of examples 16 to 32.

Example 34 is an apparatus, comprising means for performing a method according to any of examples 16 to 32.

Example 35 at least one non-transitory computer-readable storage medium comprising a set of instructions that, in response to being executed at computing device, cause the computing device to tune a primary radio frequency (RF) chain to a first carrier frequency, provide data communications using the first RF chain, determine a wireless does not provide for carrier aggregation, and configure a secondary receiver of a secondary RF chain to perform wireless network measurements.

Example 36 is an extension of Example 35, comprising instructions that, in response to being executed at the computing device, cause the computing device to generate a message indicating carrier aggregation capability.

Example 37 is an extension of Example 35, comprising instructions that, in response to being executed at the computing device, cause the computing device to tune the primary RF chain by adjusting a frequency of a primary reference signal.

Example 38 is an extension of Example 35, comprising instructions that, in response to being executed at the computing device, cause the computing device to provide data communications by transmitting and receiving RF communications using the primary RF chain.

Example 39 is an extension of Example 35, comprising instructions that, in response to being executed at the computing device, cause the computing device to receive a measurement parameter.

Example 40 is an extension of Example 39, comprising instructions that, in response to being executed at the computing device, cause the computing device to reject the received parameter.

Example 41 is an extension of Example 39, comprising instructions that, in response to being executed at the computing device, cause the computing device to configure the secondary receiver chain based on the received measurement parameter.

Example 42 is an extension of Example 39, wherein the received parameter comprises a measurement gap length (MGL).

Example 43 is an extension of Example 39, wherein the received parameter comprises a measurement gap repetition period (MGRP).

Example 44 is an extension of Example 39, wherein the received parameter comprises a measurement gap offset.

Example 45 is an extension of Example 39, wherein the received parameter comprises a measurement gap length (MGL).

Example 46 is an extension of Example 39, comprising instructions that, in response to being executed at the computing device, cause the computing device to determine a measurement gap based on the received measurement parameter.

Example 47 is an extension of Example 35, comprising instructions that, in response to being executed at the computing device, cause the computing device to adjust operation of the primary RF chain based on the configuration of the secondary RF chain.

Example 48 is an extension of Example 35, comprising instructions that, in response to being executed at the computing device, cause the computing device to perform an inter-frequency measurement.

Example 49 is an extension of Example 35, comprising instructions that, in response to being executed at the computing device, cause the computing device to perform an inter-radio access technology (RAT) measurement.

Example 50 is an extension of Example 35, comprising instructions that, in response to being executed at the computing device, cause the computing device to determine a received signal strength.

Example 51 is an extension of Example 35, comprising instructions that, in response to being executed at the computing device, cause the computing device to determine a received signal quality.

Example 52 is an extension of Example 35, comprising instructions that, in response to being executed at the computing device, cause the computing device to determine a variability of the received signal quality.

The following second set of examples pertain to further embodiments:

Example 1 is a user equipment (UE), comprising logic, at least a portion of which is in hardware, to connect to a wireless network using a first radio-frequency (RF) chain and to perform measurements on the wireless network using a second RF chain.

Example 2 is an extension of Example 1, wherein the wireless network is a 3GPP wireless network.

Example 3 is an extension of Example 1, wherein the first RF chain can be connected to a primary cell (Pcell).

Example 4 is an extension of Example 1, wherein the second RF chain can be connected to a secondary cell (Scell).

Example 5 is an extension of Example 1, wherein data communication with the wireless network is provided by the first RF chain.

Example 6 is an extension of Example 1, wherein the first and second RF chains share one or more components.

Example 7 is an extension of Example 1, wherein the first and second RF chain are distinct.

Example 8 is an extension of Example 1, wherein the measurements comprise inter-frequency measurements.

Example 9 is an extension of Example 1, wherein the measurements comprise inter-radio access technology (RAT) measurements.

Example 10 is an extension of Example 1, wherein the measurements are performed based on a measurement gap length (MGL) and a measurement gap repetition period (MGRP).

Example 11 is an extension of Example 10, wherein MGL is equal to MGL=N*5 milliseconds (ms)+1 ms, where N is a positive integer.

Example 12 is an extension of Example 10, wherein MGRP is equal to MGRP=480 ms/M, where M is a positive integer.

Example 13 is an extension of Example 10, wherein the MGL and MGRP are specified by the wireless network.

Example 14 is an extension of Example 10, wherein the MGL is set to 6 ms and the MGRP is set to 40 ms.

Example 15 is an extension of Example 14, wherein a measurement gap offset is set to an integer value between 0 and 39.

Example 16 is an extension of Example 10, wherein the MGL is set to 6 ms and the MGRP is set to 80 ms.

Example 17 is an extension of Example 16, wherein a measurement gap offset is set to an integer value between 0 and 79.

Example 18 is an extension of Example 10, wherein the MGL is set to 31 ms and the MGRP is set to 120 ms.

Example 19 is an extension of Example 18, wherein a gap pattern identification (ID) value of 2 corresponds to the MGL set to 31 ms and the MGRP set to 120 ms.

Example 20 is an extension of Example 18, wherein a measurement gap offset is set to an integer value between 0 and 119.

Example 21 is an extension of Example 10, wherein the MGL is set to 16 ms and the MGRP is set to 120 ms.

Example 21 is an extension of Example 21, wherein a gap pattern identification (ID) value of 3 corresponds to the MGL set to 31 ms and the MGRP set to 120 ms.

Example 22 is an extension of Example 21, wherein a measurement gap offset is set to an integer value between 0 and 119.

Example 24 is a user equipment, comprising a first radio-frequency (RF) chain to connect to a wireless network and a second RF chain to perform wireless network measurements.

Example 25 is an extension of Example 24, wherein the UE is a carrier aggregation capable UE.

Example 26 is an extension of Example 25, wherein the wireless network does not provide carrier aggregation.

Example 27 is an extension of Example 24, wherein the first RF chain can be connected to a primary cell (Pcell).

Example 28 is an extension of Example 24, wherein the second RF chain can be connected to a secondary cell (Scell).

Example 29 is an extension of Example 28, wherein the second RF chain is not connected to an Scell.

Example 30 is an extension of Example 24, wherein data communication with the wireless network is provided by the first RF chain.

Example 31 is an extension of Example 24, wherein the first and second RF chains share one or more components.

Example 32 is an extension of Example 24, wherein the first and second RF chain are distinct.

Example 33 is an extension of Example 24, wherein the measurements comprise inter-frequency measurements.

Example 34 is an extension of Example 24, wherein the measurements comprise inter-radio access technology (RAT) measurements.

Example 35 is an extension of Example 24, wherein the measurements are performed based on a measurement gap length (MGL) and a measurement gap repetition period (MGRP).

Example 36 is an extension of Example 35, wherein MGL is equal to MGL=N*5 milliseconds (ms)+1 ms, where N is a positive integer.

Example 37 is an extension of Example 35, wherein MGRP is equal to MGRP=480 ms/M, where M is a positive integer.

Example 38 is an extension of Example 35, wherein the MGL and MGRP are specified by the wireless network.

Example 39 is a method, comprising providing data communications with a wireless network using a first radio-frequency (RF) chain and performing wireless network measurements over a second RF chain.

Example 40 is an extension of Example 39, further comprising connecting to the wireless network using the first RF chain.

Example 41 is an extension of Example 40, further comprising determining that the second RF chain cannot connect to the wireless network.

Example 42 is an extension of Example 41, further comprising determining that the wireless network does not provide carrier aggregation.

Example 43 is an extension of Example 41, further comprising determining that the wireless network does not provide a secondary cell (Scell) for connectivity.

Example 44 is an extension of Example 43, further comprising determining that the wireless network does not provide a secondary carrier component.

Example 45 is an extension of Example 43, further comprising determining that the wireless network does not provide a secondary carrier.

Example 46 is an extension of Example 39, notifying the wireless network that the second RF chain is unused.

Example 47 is an extension of Example 39, further comprising notifying the wireless network that the second RF chain can be provisioned to perform wireless network measurements.

Example 48 is an extension of Example 39, further comprising negotiating parameters for the wireless network measurements.

Example 49 is an extension of Example 48, wherein negotiating parameters further comprises determining a measurement gap length (MGL) and a measurement gap repetition period (MGRP).

Example 50 is an extension of Example 49, further comprising setting MGL equal to MGL=N*5 milliseconds (ms)+1 ms, where N is a positive integer.

Example 51 is an extension of Example 49, further comprising setting MGRP equal to MGRP=480 ms/M, where M is a positive integer.

Example 52 is an extension of Example 49, further comprising determining interruptions to operation of the first RF chain based on the determined MGL and MGRP.

Example 53 is an extension of Example 52, further comprising adjusting operation of the first RF chain based on the determined interruptions.

Example 54 is an extension of Example 39, further comprising performing inter-frequency measurements.

Example 55 is an extension of Example 39, further comprising performing inter-radio access technology (RAT) measurements.

Example 44 is at least one non-transitory computer-readable storage medium comprising a set of instructions that, in response to being executed on a computing device, cause the computing device to perform a communication method according to any of examples 39 to 55.

Example 57 is an apparatus, comprising means for performing a communication method according to any of examples 39 to 55.

Example 58 is a user equipment (UE), comprising logic, at least a portion of which is in hardware, to perform measurements using a first radio-frequency (RF) chain based on a measurement gap length (MGL) and a measurement gap repetition period (MGRP) and to adjust operation of a second RF chain based on the measurements.

Example 59 is an extension of Example 58, wherein the measurements comprise inter-frequency measurements.

Example 60 is an extension of Example 58, wherein the measurements comprise inter-radio access technology (RAT) measurements.

Example 61 is an extension of Example 58, wherein MGL is set according to MGL=N*5 milliseconds (ms)+1 ms, where N is a positive integer.

Example 62 is an extension of Example 58, wherein MGRP is set according to MGRP=480 ms/M, where M is a positive integer.

Example 63 is an extension of Example 58, the logic to determine a measurement gap based on the MGL and the MGRP.

Example 64 is an extension of Example 63, wherein the measurement gap corresponds to one or more subframes.

Example 65 is an extension of Example 64, wherein the one or more subframes are within an MGL.

Example 66 is an extension of Example 63, the logic to prevent the second RF chain from operating during the measurement gap.

Example 67 is an extension of Example 66, the logic to prevent the second RF chain from transmitting and receiving during the measurement gap.

Example 68 is an extension of Example 63, the logic to further determine the measurement gap based on a gap offset.

Example 69 is a method comprising determining a measurement gap based on a measurement gap length (MGL), a measurement gap repetition period (MGRP), and a gap offset, performing wireless measurements during the measurement gap using a first radio-frequency (RF) chain, and preventing a second RF chain from transmitting and receiving during the measurement gap.

Example 70 is an extension of Example 69, wherein the measurement gap corresponds to one or more subframe time periods within the MGL.

Example 71 is an extension of Example 69, further comprising setting MGL according to MGL=N*5 milliseconds (ms)+1 ms, where N is a positive integer.

Example 72 is an extension of Example 69, further comprising setting MGRP according to MGRP=480 ms/M, where M is a positive integer.

Example 73 is an extension of Example 69, further comprising performing inter-frequency measurements.

Example 74 is an extension of Example 69, further comprising performing inter-radio access technology (RAT) measurements.

Example 75 is at least one non-transitory computer-readable storage medium comprising a set of instructions that, in response to being executed on a computing device, cause the computing device to perform a communication method according to any of examples 69 to 74.

Example 76 is an apparatus, comprising means for performing a communication method according to any of examples 69 to 74.

Example 77 is an evolved node B (eNB) comprising logic, at least a portion of which is in hardware, to receive an indication that a user equipment (UE) can perform measurements on an unused radio-frequency (RF) chain and to specify parameters for performing the measurements.

Example 78 is an extension of Example 77, wherein the eNB provides data communication to the UE.

Example 79 is an extension of Example 77, wherein the measurements comprise inter-frequency measurements.

Example 80 is an extension of Example 77, wherein the measurements comprise inter-radio access technology (RAT) measurements.

Example 81 is an extension of Example 77, the logic to specify a measurement gap length (MGL) and a measurement gap repetition period (MGRP).

Example 82 is an extension of Example 81, wherein MGL is specified according to MGL=N*5 milliseconds (ms)+1 ms, where N is a positive integer.

Example 83 is an extension of Example 81, wherein MGRP is specified according to MGRP=480 ms/M, where M is a positive integer.

Example 84 is an extension of Example 81, wherein the MGL is set to 6 ms and the MGRP is set to 40 ms.

Example 85 is an extension of Example 84, the logic to specify a gap offset to be an integer value between 0 and 39.

Example 86 is an extension of Example 81, wherein the MGL is set to 6 ms and the MGRP is set to 80 ms.

Example 87 is an extension of Example 86, the logic to specify a gap offset to be an integer value between 0 and 79.

Example 88 is an extension of Example 81, wherein the MGL is set to 31 ms and the MGRP is set to 120 ms.

Example 89 is an extension of Example 88, the logic to specify the MGL set to 31 ms and the MGRP set to 120 ms by specifying a corresponding gap pattern identification (ID) value of 2.

Example 90 is an extension of Example 88, the logic to specify a gap offset to be an integer value between 0 and 119.

Example 91 is an extension of Example 81, wherein the MGL is set to 16 ms and the MGRP is set to 120 ms.

Example 92 is an extension of Example 91, the logic to specify the MGL is set to 16 ms and the MGRP is set to 120 ms by specifying a corresponding gap pattern identification (ID) value of 3.

Example 93 is an extension of Example 92, the logic to specify a gap offset to be an integer value between 0 and 119.

Example 94 is an extension of Example 81, the logic to transmit the specified parameters.

Example 95 is an extension of Example 94, the logic to transmit updated specified parameters after receiving an indication that the specified parameters are rejected.

Example 96 is a method comprising receiving an indication that a User Equipment (UE) can perform measurements on an unused radio-frequency (RF) chain and specifying parameters for performing the measurements.

Example 97 is an extension of Example 96, further comprising providing data communication to the UE.

Example 98 is an extension of Example 96, wherein specifying further comprises specifying a measurement gap length (MGL) and a measurement gap repetition period (MGRP).

Example 99 is an extension of Example 96, further comprising transmitting the specified parameters.

Example 100 is an extension of Example 99, further comprising transmitting updated specified parameters after receiving an indication that the specified parameters are rejected.

Example 101 is at least one non-transitory computer-readable storage medium comprising a set of instructions that, in response to being executed on a computing device, cause the computing device to perform a communication method according to any of examples 96 to 100.

Example 102 is an apparatus comprising means for performing a communication method according to any of examples 96 to 100.

The following third set of examples pertain to further embodiments:

Example 1 is a user equipment (UE), comprising a first radio frequency (RF) chain capable of operating according to a primary component carrier, a second RF chain capable of operating according to a secondary component carrier, and logic, at least a portion of which is in hardware, to process an indication that carrier aggregation using the primary component carrier and the secondary component carrier is unavailable and to manage operation of a second receiver chain of the second RF chain to perform a wireless network measurement.

Example 2 is an extension of Example 1, wherein the wireless network is a 3rd Generation Partnership Project (3GPP) wireless network.

Example 3 is an extension of Example 2, wherein the primary component carrier corresponds to a primary serving cell (Pcell).

Example 4 is an extension of Example 3, wherein the secondary component carrier corresponds to a secondary serving cell (Scell).

Example 5 is an extension of Example 2, wherein the 3GPP wireless network does not support carrier aggregation using the primary component carrier and the secondary component carrier.

Example 6 is an extension of Example 2, the logic to receive the indication from the 3GPP wireless network.

Example 7 is an extension of Example 2, wherein the measurement includes one of an inter-frequency measurement and an inter-radio access technology (RAT) measurement.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion. Further, operations for various embodiments may have been described with reference to a logic flow. Although figures and corresponding descriptions presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
   a primary radio frequency (RF) chain;
   a secondary RF chain including a secondary receiver chain; and
   logic, at least a portion of which is in hardware, to manage wireless data communications using the primary RF chain, the logic to configure the secondary receiver chain to perform wireless network measurements based on a measurement gap length (MGL), a measurement gap repetition period (MGRP), and a measurement gap offset, the MGRP to comprise 120 ms, the MGL to comprise 16 ms or 31 ms.

2. The UE of claim 1, the logic to determine that the wireless network does not support carrier aggregation and to configure the secondary receiver chain to perform a wireless network measurement.

3. The UE of claim 1, wherein the wireless network measurement comprises an inter-frequency measurement.

4. The UE of claim 1, wherein the wireless network measurement comprises an inter-radio access technology (RAT) measurement.

5. The UE of claim 1, wherein the wireless network measurement comprises determining a received signal strength.

6. The UE of claim 1, wherein the wireless network measurement comprises determining a received signal quality.

7. The UE of claim 6, wherein the wireless network measurement comprises determining a variability of the received signal quality.

8. The UE of claim 1, wherein the UE is a carrier aggregation capable UE.

9. The UE of claim 1, the logic to adjust operation of the primary RF chain based on the configuration of the secondary receiver chain to perform the wireless network measurement.

10. The UE of claim 1, the secondary receiver chain comprising at least one of a bandpass filter, a low noise amplifier, a mixer, a tuner, and an analog-to-digital converter.

11. A method, comprising:
tuning a primary radio frequency (RF) chain to a first carrier frequency;
providing data communications using the first RF chain;
determining a wireless network does not provide for carrier aggregation; and
configuring a secondary receiver of a secondary RF chain to perform wireless network measurements based on a measurement gap length (MGL), a measurement gap repetition period (MGRP), and a measurement gap offset, the MGRP to comprise 120 ms the MGL to comprise 16 ms or 31 ms.

12. The method of claim 11, further comprising determining the MGL, the MGRP, and the measurement gap offset based on one or more messages received from an evolved node B (eNB).

13. The method of claim 11, further comprising adjusting operation of the primary RF chain based on the configuration of the secondary RF chain.

14. The method of claim 11, further comprising performing one of an inter-frequency measurement and an inter-radio access technology (RAT) measurement.

15. At least one non-transitory computer-readable storage medium comprising a set of instructions that, in response to being executed at user equipment (UE), cause the UE to:
tune a primary radio frequency (RF) chain to a first carrier frequency;
provide data communications using the first RF chain;
determine that a wireless network does not provide for carrier aggregation; and
configure a secondary receiver of a secondary RF chain to perform wireless network measurements based on a measurement gap length (MGL), a measurement gap repetition period (MGRP), and a measurement gap offset, the MGRP to comprise 120 ms the MGL to comprise 16 ms or 31 ms.

16. The at least one non-transitory computer-readable storage medium of claim 15, comprising instructions that, in response to being executed at the computing device, cause the computing device to adjust operation of the primary RF chain based on the configuration of the secondary RF chain.

17. The at least one non-transitory computer-readable storage medium of claim 15, comprising instructions that, in response to being executed at the computing device, cause the computing device to perform one of an inter-frequency measurement and an inter-radio access technology (RAT) measurement.

18. User equipment (UE), comprising:
a first radio frequency (RF) chain capable of operating according to a primary component carrier;
a second RF chain capable of operating according to a secondary component carrier; and
logic, at least a portion of which is in hardware, to process an indication that carrier aggregation using the primary component carrier and the secondary component carrier is unavailable and to manage operation of a second receiver chain of the second RF chain to perform wireless network measurements based on a measurement gap length (MGL), a measurement gap repetition period (MGRP), and a measurement gap offset, the MGRP to comprise 120 ms, the MGL to comprise 16 ms or 31 ms.

19. The UE of claim 18, wherein the wireless network is a 3rd Generation Partnership Project (3GPP) wireless network.

20. The UE of claim 19, wherein the primary component carrier corresponds to a primary serving cell (Pcell).

21. The UE of claim 20, wherein the secondary component carrier corresponds to a secondary serving cell (Scell).

22. The UE of claim 19, wherein the 3GPP wireless network does not support carrier aggregation using the primary component carrier and the secondary component carrier.

23. The UE of claim 19, the logic to receive the indication from the 3GPP wireless network.

24. The UE of claim 19, wherein the measurement includes one of an inter-frequency measurement and an inter-radio access technology (RAT) measurement.

* * * * *